(12) United States Patent
Ye et al.

(10) Patent No.: US 10,994,206 B2
(45) Date of Patent: *May 4, 2021

(54) APPARATUS AND METHOD FOR CONTROLLING OBJECT

(71) Applicant: NEXON KOREA CORPORATION, Seongnam-si (KR)

(72) Inventors: Jung Kyu Ye, Anyang-si (KR); Geon Yeong Kim, Yongin-si (KR); Chang Hoon Yi, Seoul (KR); Joo Seok Lee, Goyang-si (KR); Guhyun Park, Seongnam-si (KR); Young Suk Kim, Seoul (KR); Jae Hyun Park, Gwacheon-si (KR); June Sik Yi, Seoul (KR); Hun Joon Ha, Seongnam-si (KR); Nak Hyun Kim, Seoul (KR); Ho Sik Kim, Seongnam-si (KR); Jeong Min Seo, Seongnam-si (KR); Tae Hoon Koo, Seoul (KR); Duc Chun Kim, Seongnam-si (KR); Seoung Hwi Jung, Seongnam-si (KR); Byung Eun Jin, Seoul (KR); Jin Woo Lee, Seongnam-si (KR); Seok Hyun Kim, Seoul (KR); Ju Yong Lim, Seongnam-si (KR); Hyun Ju Cho, Seoul (KR); Sang Yeop Lee, Seoul (KR); Min Kwan Chae, Seoul (KR); Sang Ho Kim, Uiwang-si (KR); Hee Seok Kang, Suwon-si (KR); Seongkwan Lee, Seoul (KR); Jeong Pyo Hong, Seongnam-si (KR); Choong Yeol Lee, Suwon-si (KR); Yong Woo Park, Seongnam-si (KR); Kyoung Su Lee, Seongnam-si (KR); Yu Ju Kim, Uiwang-si (KR); Dong Gook Lee, Seoul (KR); Hyun Jin Kim, Gwangmyeong-si (KR); Hyun Jeong Lee, Seoul (KR); Dong Young Chang, Yongin-si (KR); Jong Min Lee, Seongnam-si (KR); Jin Woo Lee, Uiwang-si (KR); Song I Han, Seoul (KR); Taek Ki Lee, Seoul (KR); Eun Ji Nam, Seoul (KR); Choon Hwa Lee, Seongnam-si (KR); Young Min Kang, Anyang-si (KR); Jung Soo Lee, Yongin-si (KR)

(73) Assignee: NEXON KOREA CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,857

(22) Filed: Apr. 19, 2019

(65) Prior Publication Data
US 2019/0240578 A1    Aug. 8, 2019

Related U.S. Application Data

(63) Continuation of application No. 14/791,084, filed on Jul. 2, 2015, now Pat. No. 10,315,112.

(30) Foreign Application Priority Data

Dec. 22, 2014 (KR) .......................... 10-2014-0186485
Feb. 11, 2015 (KR) .......................... 10-2015-0021116

(51) Int. Cl.
*A63F 13/58* (2014.01)
*G06F 3/0481* (2013.01)
(Continued)

(52) U.S. Cl.
CPC ............ *A63F 13/58* (2014.09); *A63F 13/213* (2014.09); *A63F 13/52* (2014.09); *A63F 13/53* (2014.09);
(Continued)

(58) Field of Classification Search
None
See application file for complete search history.

(56) References Cited

U.S. PATENT DOCUMENTS

| 5,802,296 A | 9/1998 | Morse |
| 6,476,830 B1 | 11/2002 | Farmer |

(Continued)

FOREIGN PATENT DOCUMENTS

| CN | 1194705 | 9/1989 |
| CN | 102609985 | 7/2012 |

(Continued)

OTHER PUBLICATIONS

"Grand Theft Auto 5 (GTA5) Transformable animal display and transformation location graphic view," Jan. 2015, http://www.zgonglue.com/a/201501/240783.html, 35 pages.

(Continued)

*Primary Examiner* — Mandrita Brahmachari
(74) *Attorney, Agent, or Firm* — Morgan, Lewis & Bockius LLP

(57) ABSTRACT

An apparatus for controlling an object may include a communicator configured to communicate with a first user (Continued)

terminal and a second user terminal, and a processor configured to control a first object corresponding to a first user in a virtual world to be displayed, configured to control the first object to move in the virtual world in response to a movement control of the first user, configured to randomly select at least one candidate object in response to a morphing control of the first user, and configured to change the first object to a second object when the first user selects the second object from the at least one candidate object. Methods for controlling an object are also provided.

17 Claims, 37 Drawing Sheets

(51) Int. Cl.
    *G06F 3/0482*     (2013.01)
    *H04L 29/06*     (2006.01)
    *A63F 13/52*     (2014.01)
    *A63F 13/655*     (2014.01)
    *A63F 13/213*     (2014.01)
    *A63F 13/53*     (2014.01)

(52) U.S. Cl.
    CPC .......... *A63F 13/655* (2014.09); *G06F 3/0482* (2013.01); *G06F 3/04815* (2013.01); *H04L 67/38* (2013.01)

(56) References Cited

U.S. PATENT DOCUMENTS

| | | | |
|---|---|---|---|
| 8,876,611 B2* | 11/2014 | Yuan | A63F 13/52 463/42 |
| 2002/0091005 A1 | 7/2002 | Shoji | |
| 2003/0190950 A1 | 10/2003 | Matsumoto | |
| 2007/0060343 A1 | 3/2007 | Sakaguchi et al. | |
| 2007/0265047 A1 | 11/2007 | Nomura | |
| 2009/0305770 A1 | 12/2009 | Bennett | |
| 2010/0311503 A1 | 12/2010 | McMain | |
| 2011/0098092 A1* | 4/2011 | Reiche, III | A63F 13/65 463/1 |
| 2011/0099231 A1 | 4/2011 | Steinhauer | |
| 2011/0131510 A1 | 6/2011 | DeLuca | |
| 2013/0244748 A1 | 9/2013 | Kitamura | |
| 2015/0018091 A1* | 1/2015 | Suzuki | A63F 13/85 463/29 |

FOREIGN PATENT DOCUMENTS

| | | | |
|---|---|---|---|
| CN | 103127717 | | 6/2013 |
| CN | 103703789 | | 4/2014 |
| CN | 103838982 | | 6/2014 |
| CN | 103902806 | | 7/2014 |
| JP | H 09-164271 | | 6/1997 |
| JP | 2001-046737 | | 2/2001 |
| JP | 2001-340637 | | 12/2001 |
| JP | 2007-075608 | | 3/2007 |
| JP | 2014-191647 | | 10/2014 |
| KR | 20110125963 | * | 11/2011 |
| TW | I313617 B | | 8/2009 |
| TW | 201023947 A | | 7/2010 |

OTHER PUBLICATIONS

Arweth, "Garry's Mod—Prop Hunt—Guide and FAQ," retrieved from https://arwetj/cp,/garrys-mod/prop-hunt/, posted on Nov. 7, 2013, 13 pages.

Hanjuko Hero Oh World, Promptly Cooking Guide, 1st Edition, Digicube Co Ltd, Feb. 14, 2002, 16 pages.

Shui, "<<Transformation, princess>> Which career is good?—Strategy for initial career choice," Nov. 23, 2014, retrieved from http://www.wanyx.com/shoujigonglue/93202_2.html, 7 pages.

Chinese Office Action from Chinese Patent Application No. 201510182071.2, dated Feb. 15, 2019, 16 pages including machine-generated translation.

Japanese Office Action from Japanese Patent Application No. 2015-040527, dated Dec. 4, 2018, 8 pages including machine-generated translation.

* cited by examiner

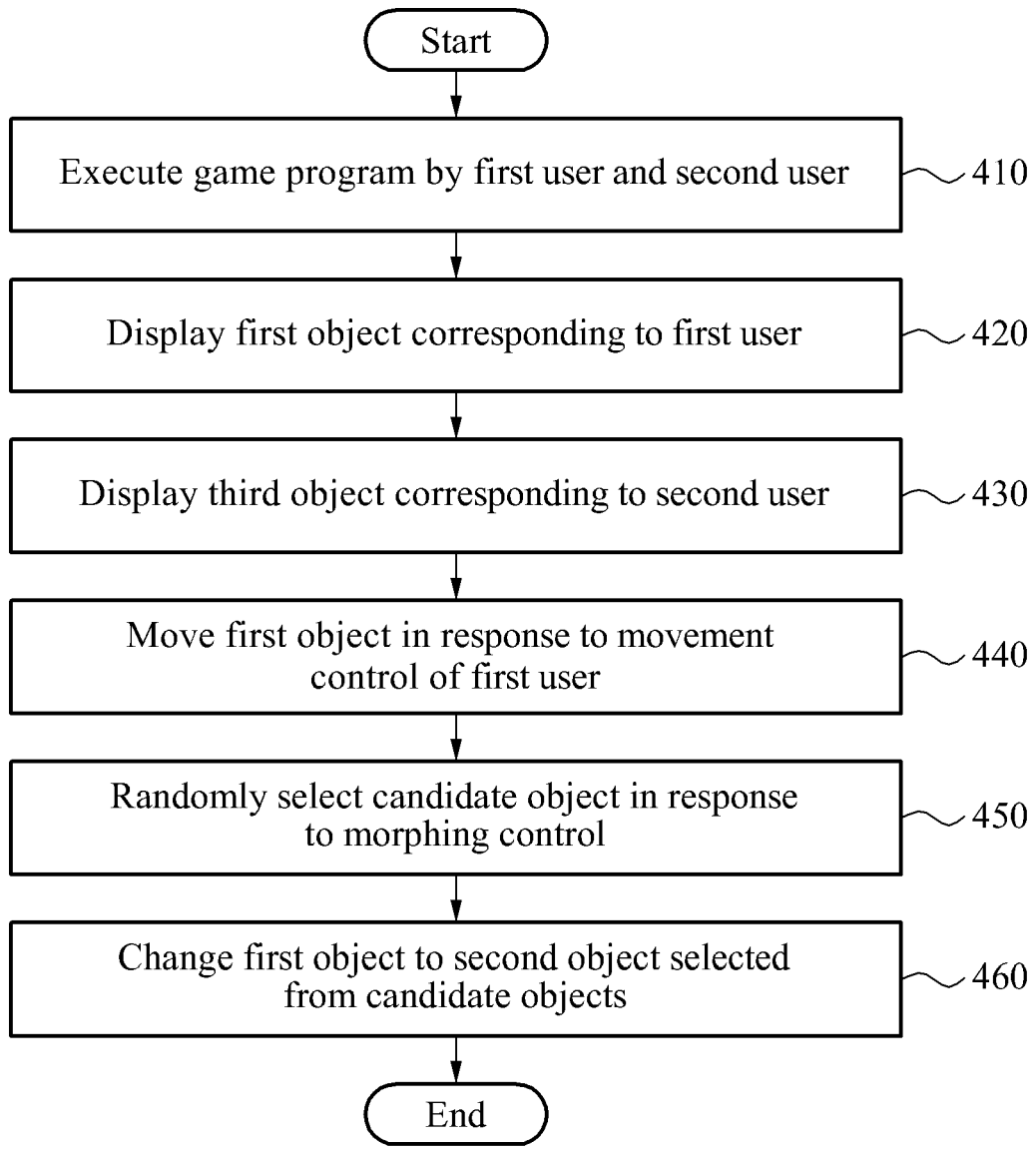

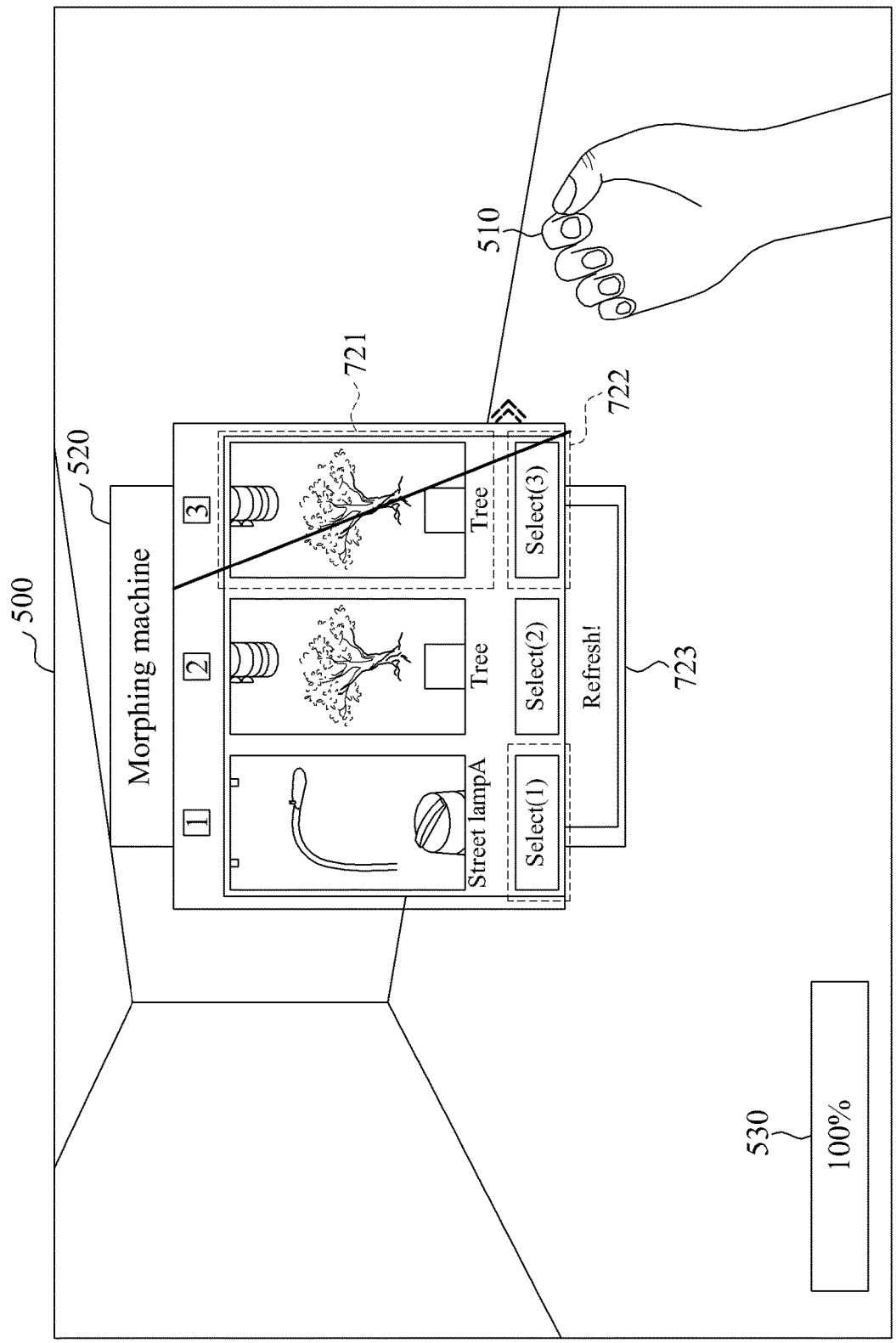

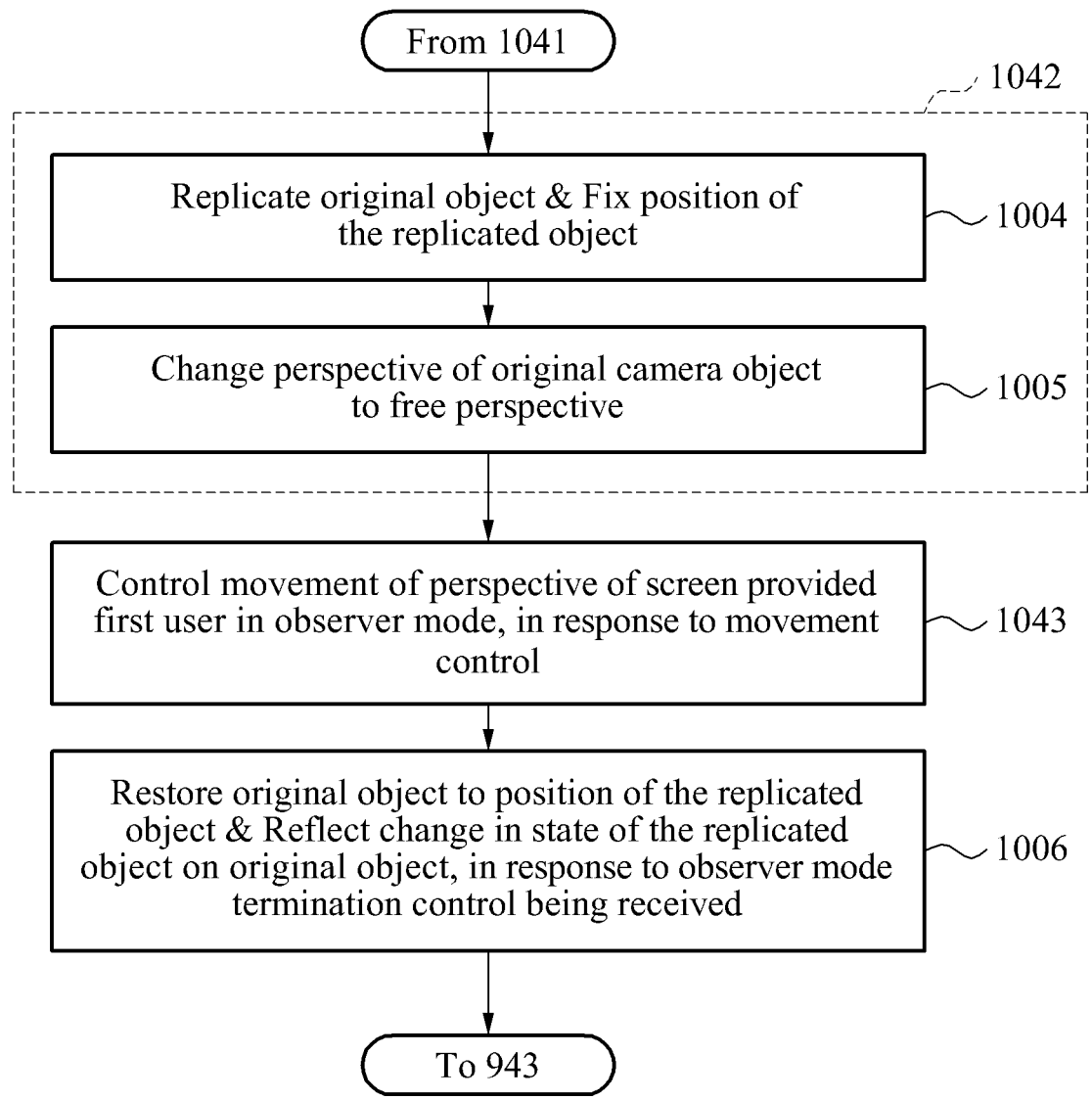

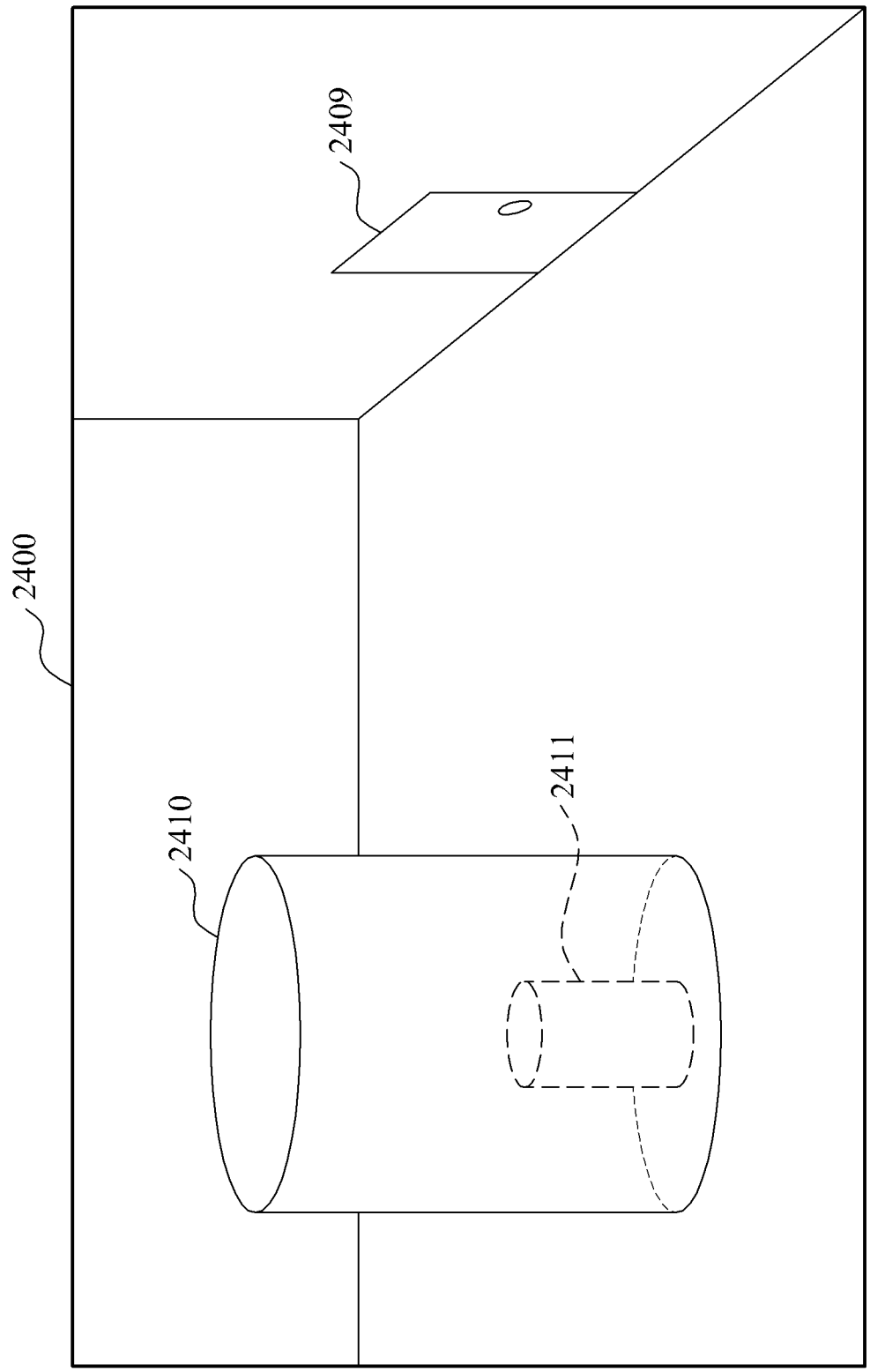

APPARATUS AND METHOD FOR CONTROLLING OBJECT

CROSS-REFERENCE TO RELATED APPLICATIONS

This application is a continuation application of application Ser. No. 14/791,084, filed on Jul. 2, 2015, now U.S. Pat. No. 10,315,112, which claims the benefit of Korean Patent Application No. 10-2014-0186485 and of Korean Patent Application No. 10-2015-0021116, respectively filed on Dec. 22, 2014 and Feb. 11, 2015, in the Korean Intellectual Property Office, the entirety of each of which is incorporated herein by reference.

FIELD

The present disclosure relates to apparatus and methods for controlling one or more objects.

BACKGROUND

Online games are games played over various networks, and have been rapidly grown due to development of the Internet. Online games may include, for example, a multiple user dialogue or multiple user dungeon (MUD) game and a multiple user graphics (MUG) game a program is installed to a hard disk drive and a user accesses an Internet server to enjoy a game, a web-based game played using only a browser, and a mobile game played on a mobile phone or a portable game console. Various devices, for example, computers, mobile phones, or portable game consoles may support online games in various fields, however, online games generally refer to wired online games played using a computer via the Internet.

A game, as a type of online games, for displaying a screen in a first-person perspective of a character controlled by a user may be referred to as a first-person shooter (FPS) game. In the FPS game, a user may feel as if the user observes content of the game while moving in the game and accordingly, an effect of increasing a sensory level for the game of the user may be obtained. In the FPS game, when a character controlled by a user control looks at a left side, a direction of a game screen may be changed to a direction corresponding to a gaze of the character on the left side. When the character looks at a right side, the direction of the game screen may be changed to a direction corresponding to a gaze of the character on the right side.

The description provided in the background section, including without limitation, any problems, features, solutions or information, should not be assumed to be prior art merely because it is mentioned in or associated with the background section. The background section may include information that describes one or more aspects of the subject technology.

SUMMARY

According to one or more aspects, there is provided a method of controlling an object, including controlling a first object corresponding to a first user in a virtual world to be displayed, controlling the first object to move in the virtual world in response to a movement control of the first user, randomly selecting at least one candidate object in response to a morphing control of the first user; and changing the first object to a second object when the first user selects the second object from the at least one candidate object.

According to one or more aspects, there is provided an apparatus for controlling an object, including a communicator configured to communicate with a first user terminal and a second user terminal, and a processor configured to control a first object corresponding to a first user in a virtual world to be displayed, to control the first object to move in the virtual world in response to a movement control of the first user, to randomly select at least one candidate object in response to a morphing control of the first user, and to change the first object to a second object when the first user selects the second object from the at least one candidate object.

The foregoing description in this summary section may provide some illustrative examples of the disclosure. This section is not intended to be a broad overview or to identify essential elements of the disclosure.

BRIEF DESCRIPTION OF THE DRAWINGS

These and/or other aspects, features, and advantages of the subject technology may become apparent and more readily appreciated from the following description of examples, taken in conjunction with the accompanying drawings of which:

FIG. 4 is a flowchart illustrating an example of a method of controlling an object according to one or more implementations of the present disclosure;

FIGS. 6 and 7 illustrate an example of selecting a candidate object according to one or more implementations of the present disclosure;

FIGS. 10A through 10C illustrate examples of providing an object in an observer mode according to one or more implementations of the present disclosure;

FIGS. 23 and 24 illustrate examples of a change in a collision box, a judgment box and an appearance of an object in a virtual world according to one or more implementations of the present disclosure.

DETAILED DESCRIPTION

Figure 1:
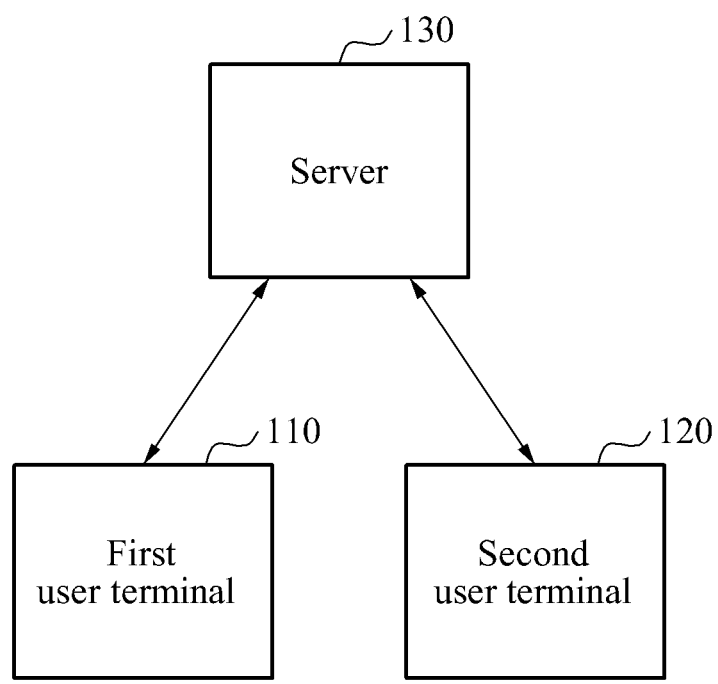
FIG. 1 is a block diagram illustrating an example of a configuration of a system for controlling an object according to one or more implementations of the present disclosure.

Exemplary one or more implementations are described in detail with reference to the accompanying drawings. Various alterations and modifications may be made to the exemplary one or more implementations, some of which are illustrated in detail in the drawings and detailed description. However, it should be understood that these one or more implementations are not construed as limited to the illustrated forms and include all changes, equivalents or alternatives within the idea and the technical scope of this disclosure.

The terminology used herein is for the purpose of describing particular one or more implementations only and is not intended to be limiting of the present disclosure. As used herein, the singular forms "a," "an" and "the" are intended to include the plural forms as well, unless the context clearly indicates otherwise. It is further understood that the terms "include" and/or "have," when used herein, specify the presence of stated features, integers, steps, operations, elements, components and/or combinations thereof, but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this subject technology belongs. It is further understood that terms, such as those defined in commonly used dictionaries, are interpreted as having a meaning that is consistent with their meaning in the context of the relevant art and are not interpreted in an idealized or overly formal sense unless expressly so defined herein.

Like reference numerals in the drawings denote like elements, and redundant descriptions of like elements are omitted herein. When it is determined a detailed description of a related known function or configuration they may make the purpose of the present disclosure unnecessarily ambiguous in describing the present disclosure, the detailed description is omitted herein. FIG. 1 is a block diagram illustrating an example of a configuration of a system for controlling an object according to one or more implementations of the present disclosure.

The system 100 of FIG. 1 may include a first user terminal 110, a second user terminal 120, and a server 130.

The first user terminal 110 may control a first object corresponding to a first user. For example, using the first user terminal 110, the first user may access the server 130 with a first user account and may control a first object generated in the server 130. The first user terminal 110 may transmit, to the server 130, an authentication request for the first user account. When an authentication of the first user account succeeds, the first user terminal 110 may generate the first object corresponding to the first user terminal 110 in the server 130. The generated first object may be provided to at least one of the first user terminal 110 and the second user terminal 120. In response to a control of the first user, the first user terminal 110 may directly control the first object or may request the server 130 to control the first object.

In the present disclosure, the first user may refer to a user (for example, a hider of a hide-and-seek game) classified as one group in a game service provided by the server 130. According to one or more implementations, during a game, a user in one group may control an object corresponding to the user to morph into another object through a morphing control. Accordingly, the object may hide in a virtual world and the user in the group may feel interested in hiding from a user in another group. In addition, the user in the other group may feel interested in finding the user in the group.

Additionally, in the present disclosure, the game service may refer to a service to provide a game play to a user, and a game play may include at least one stage. Each stage may change state information of all users in one group to indicate a predetermined state (for example, a death state). When a period of time assigned to a corresponding stage elapses, the stage may end. For example, when state information of all users in one group changes to indicate a predetermined state, the server 130 may determine that users in another group win a corresponding stage. In this example, when a portion of the users in the two groups is not in the predetermined state and when a period of time assigned to the stage elapses, the server 130 may calculate a score based on state information of the users in the two groups and may determine which group wins the stage based on the calculated score.

The second user terminal 120 may control a third object corresponding to a second user. For example, using the second user terminal 120, the second user may access the server 130 with a second user account and may control a third object generated in the server 130. The second user terminal 120 may transmit, to the server 130, an authentication request for the second user account. When an authentication of the second user account succeeds, the second user terminal 120 may generate the third object corresponding to the second user terminal 120 in the server 130. The generated third object may be provided to at least one of the first user terminal 110 and the second user terminal 120. In response to a control of the second user, the second user terminal 120 may control the third object.

In the present disclosure, the second user may refer to a user (for example, a seeker of a hide-and-seek game) classified as another group distinguished from the first user in a game service provided by the server 130.

The first object corresponding to the first user and the third object corresponding to the second user may interact with each other through the server 130, in response to the control of the first user and the control of the second user, respectively. FIG. 1 illustrates a single first user terminal and a single second user terminal, however, there is no limitation thereto. For example, the system 100 may include a plurality of first user terminals and a plurality of second user terminals.

A configuration of each of the first user terminal 110 and the second user terminal 120 is further described with reference to FIG. 3.

The server 130 may provide the first object corresponding to the first user and the third object corresponding to the second user to the first user terminal 110 and the second user terminal 120, respectively. For example, the server 130 may provide a game service to the first user terminal 110 and the second user terminal 120. Hereinafter, the server 130 may be referred to as the "game server 130." The first object and the third object may correspond to game characters used when the first user and the second user play a corresponding game via the game server 130. The first object and the third object may be temporarily or semipermanently stored in the game server 130. A configuration of the game server 130 is further described with reference to FIG. 2.

Figure 2:
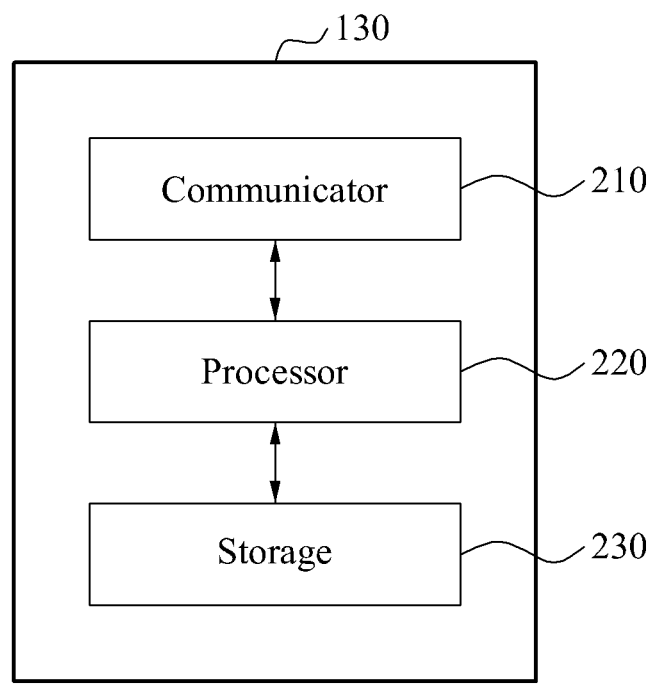
FIG. 2 is a block diagram illustrating an example of a configuration of a server for controlling an object described with reference to the system of FIG. 1.

FIG. 2 is a block diagram illustrating an example of a configuration of a server for controlling an object described with reference to the system of FIG. 1.

Referring to FIG. 2, the game server 130 may include a communicator 210, a processor 220, and a storage 230.

The communicator 210 may communicate with a first user terminal and a second user terminal. For example, the communicator 210 may communicate with a user terminal using at least one of a wireless communication and a wired communication. To provide information associated with a game to at least one of the first user terminal and the second user terminal, the communicator 210 may communicate with at least one of the first user terminal and the second user terminal. For example, the communicator 210 may be a hardware module, for example, a network interface card, a network interface chip or a network interface port, or may be a software module, for example, a network device driver or a networking program.

The processor 220 may perform processing to provide a game service. For example, the processor 220 may generate information that is associated with a game and that is required to provide the game service. The processor 220 may generate, for example, a resource of a game as the information associated with the game. Additionally, the processor 220 may perform processing required to operate the game server 130. The performing of the processing may indicate executing a program code stored in the game server 130. The processor 220 may include, for example, at least one processor or at least one core in a processor.

The processor 220 may provide a game service to the first user terminal and the second user terminal, using the communicator 210. For example, the processor 220 may control a first object in a game in response to a control of a first user being received from the first user terminal, or may control a third object in the game in response to a control of a second user being received from the second user terminal. Additionally, the processor 220 may process an interaction between the first object corresponding to the first user and the third object corresponding to the second user. Moreover, the processor 220 may control a second object into which the first object morphs and that corresponds to the first user. Furthermore, the processor 220 may perform operations that are described with reference to FIGS. 4 through 22.

The storage 230 may store information required to provide a game service. The storage 230 may store a program including instructions to operate the game server 130. The program stored in the storage 230 may be executed by the processor 220. For example, the storage 230 may store instructions to perform operations to provide a game service to user terminals, and account information of each user account (for example, an identification (ID) of an account, a password, information associated with a user's character or information associated with a user's item).

Figure 3:
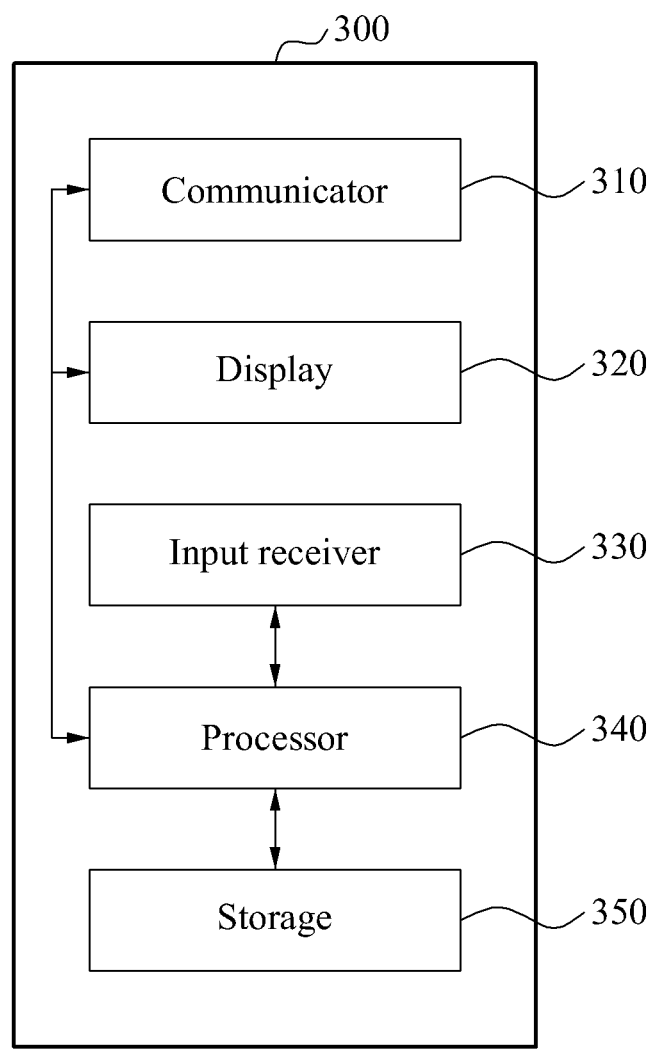
FIG. 3 is a block diagram illustrating an example of a configuration of a user terminal for controlling an object according to one or more implementations of the present disclosure.

FIG. 3 is a block diagram illustrating an example of a configuration of a user terminal for controlling an object according to one or more implementations of the present disclosure.

FIG. 3 illustrates a configuration of the user terminal 300. The user terminal 300 of FIG. 3 may include a communicator 310, a display 320, an input receiver 330, a processor 340, and a storage 350.

The communicator 310 may communicate with a game server. For example, the communicator 310 may communicate with the game server, using at least one of a wireless communication and a wired communication. The communicator 310 may transmit or receive, to or from the game server, information that is associated with a game and that is required to provide the game service.

The display 320 may display a screen associated with the game service to a user. In response to a control of the processor 340, the display 320 may display a screen to the user based on the information associated with the game.

The input receiver 330 may receive an input of a user control from a user. The user control received by the input receiver 330 may be converted to a command associated with the game service by the processor 340. The command may include, for example, a command to control an object in a game (for example, a first object, a second object or a third object). In the present disclosure, a control may include, for example, a movement control, a freezing control, an unfreezing control, an observer mode entry control, and all controls received from a user while a game service is provided.

The processor 340 may perform processing to provide a game service to a user. For example, the processor 340 may control at least one of the communicator 310, the display 320, the input receiver 330, and the storage 350 so that a game play based on a game service may be provided to the user based on information associated with a game received from the game server. The processor 340 may directly process an authentication of a user account, or may transmit an authentication request to the game server via the communicator 310. Additionally, the processor 340 may perform processing required for an operation of the user terminal 300. The performing of the processing may indicate executing a program code stored in the storage 350.

The storage 350 may store a program including instructions to operate the user terminal 300. The program stored in the storage 350 may be executed by the processor 340. The storage 350 may store, for example, a game program.

The first user terminal 110 and the second user terminal 120 of FIG. 1 may be configured as the above-described user terminal 300.

FIG. 4 is a flowchart illustrating an example of a method of controlling an object according to one or more implementations of the present disclosure.

Referring to FIG. 4, in operation 410, a first user and a second user may execute a game program. For example, the first user and the second user may execute the game program using a first user terminal and using a second user terminal, respectively.

The first user may request a game server to perform an authentication of a first user account using the first user terminal. The second user may request the game server to perform an authentication of a second user account using the second user terminal. When the authentications succeed, the first user and the second user may create a game room in the game server, and may start playing a game. The game server may provide a virtual world corresponding to the game room to the first user terminal and the second user terminal. A game provided in each game room may include a plurality of stages.

In operation 420, at least one of the first user terminal and the second user terminal may display a first object corresponding to the first user. For example, a user terminal that provides a perspective from which the first object corresponding to the first user is observed may display the first object. The first object may be displayed in a first-person perspective or a third-person perspective on the first user terminal. When observing of the first object in the virtual world is possible in a perspective provided to the second user terminal (for example, a perspective of a position of a third object), the first object may be displayed as an independent user object on the second user terminal. In the present disclosure, the user object may refer to a playable object controlled by the first user or the second user. The game server may control the first object to be displayed in the virtual world.

In operation 430, at least one of the first user terminal and the second user terminal may display a third object corresponding to the second user. For example, a user terminal that provides a perspective from which the third object corresponding to the second user is observed may display a second object. The third object may be displayed in a first-person perspective or a third-person perspective on the second user terminal. When observing of the third object in the virtual world is possible in a perspective provided to the first user terminal (for example, a perspective of a position of the first object or the second object), the third object may be displayed as an independent user object on the first user terminal.

The second user terminal may provide the second user with a dark screen so that information may not be provided during a predetermined period of time (for example, 40 seconds) after start of a game. When the dark screen is being displayed on the second user terminal, first users may hide a first object or a second object all over the virtual world by controlling the first object or the second object. Additionally, the first object corresponding to the first user may be changed to the second object either at the start of a game or during the game or both.

In operation 440, the game server may move the first object, in response to a movement control of the first user. For example, in response to the movement control of the first user, the first user terminal may request the game server to change coordinates of the first object in the virtual world. In response to the movement control, the game server may control the first object in the virtual world to move. The first user terminal may display the first object to the first user based on the changed coordinates. The movement control may refer to a control to move the first object.

In operation 450, the game server may randomly select a candidate object in response to a morphing control being received from the first user. The morphing control may refer to a control of a user to change the first object to another object. For example, at least one candidate object may be selected.

In operation 460, the game server may change the first object to a second object selected from candidate objects. For example, when the first user selects the second object from at least one candidate object, the game server may change the first object to the second object. The candidate object may refer to an object selectable by the first user, and the first user may select a candidate object the first user desires to change. In an example, during a game, an object corresponding to a user in one group may be controlled to morph into another object and may hide in a virtual world and accordingly, each user in the group may feel interested in hiding from a user in another group and the user in the other group may feel interested in finding the user in the group. Additionally, a candidate object a user desires to morph may be selected and provided to the user and thus, the user may more efficiently and quickly change the object.

In the following description, a first object may be used as an object corresponding to a first user, however, there is no limitation to the first object. For example, a second object may correspond to the first user.

Figure 5A:
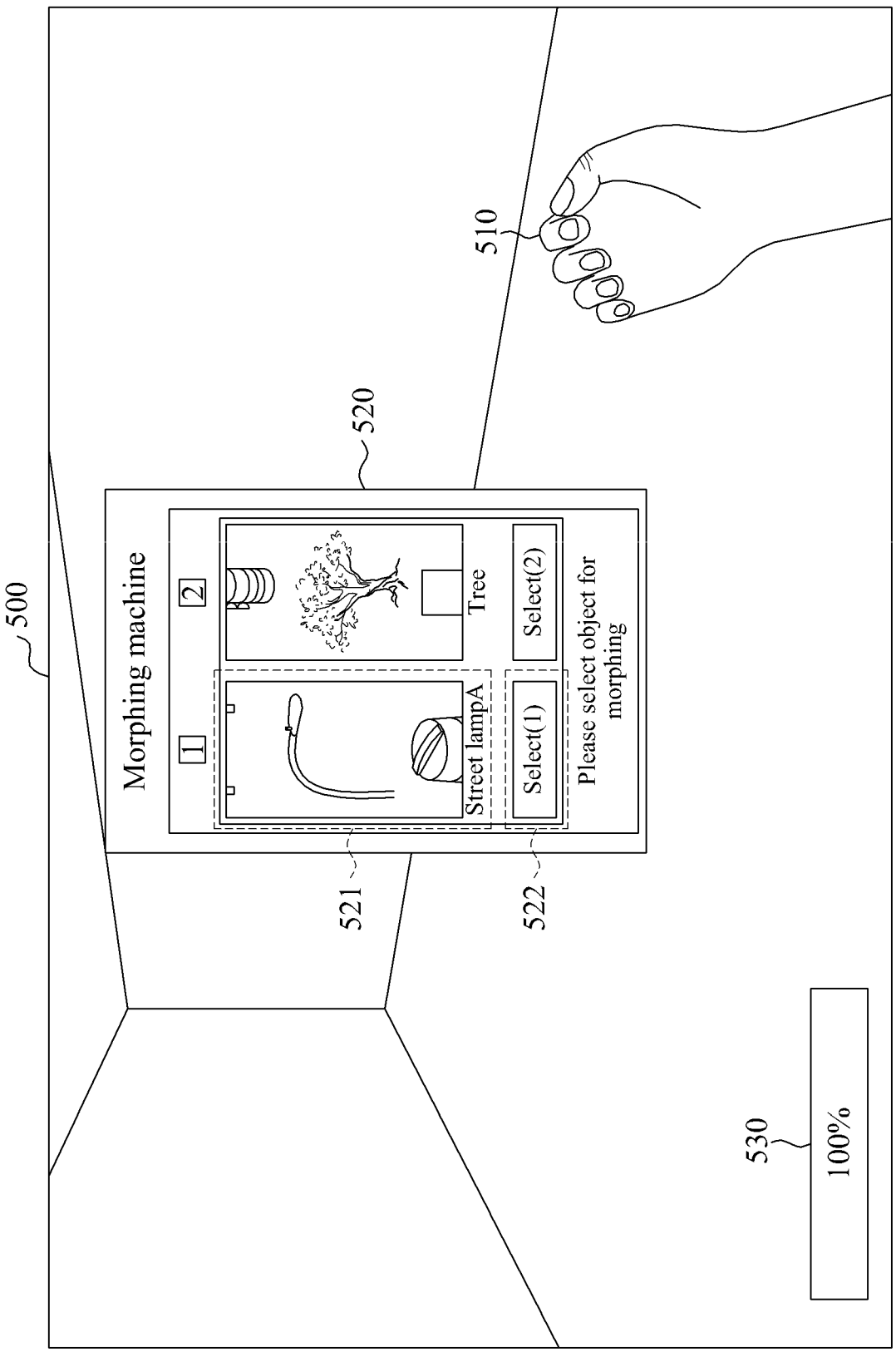
FIG. 5A illustrates an example of a screen of a user terminal for controlling an object according to one or more implementations of the present disclosure.

FIG. 5A illustrates an example of a screen of a user terminal for controlling an object according to one or more implementations of the present disclosure.

FIG. 5A illustrates a game screen 500 of a first user. In FIG. 5A, a first object corresponding to the first user may be displayed in a first-person perspective 510, however, there is no limitation thereto. For example, the first object may be displayed, for example, in a third-person perspective or a free perspective (for example, a perspective regardless of a position of an object in a virtual world).

Referring to FIG. 5A, first state information 530 of the first object (for example, 100%) may be displayed on the game screen 500. The first state information 530 may be a hit point (HP) of the first object. The first user may be set to lose in a corresponding game when an HP reaches zero. The first state information 530 may change based on a state change control received from a second user. For example, when a validity of the state change control received from the second user is verified, a game server may change the first state information 530. In this example, the game server may change the first state information 530 so that an HP of a first object or a second object corresponding to the first user may decrease.

In response to a morphing control being received from the first user (for example, in operation 450 of FIG. 4), a first user terminal may call a morphing interface 520, and may display the morphing interface 520 on the game screen 500. The morphing interface 520 may display randomly selected candidate objects in response to the morphing control being received. For example, in response to the morphing control being received, the morphing interface 520 may display candidate objects so that the candidate objects may sequentially alternately appear in a predetermined direction (for example, a direction from top to bottom or a direction from bottom to top). The candidate objects may be randomly placed in a line in a slot 521 and may be provided, for example, using a similar scheme to a slot machine.

In an example, in response to a slot stop control of the morphing interface 520 being received from the first user when the candidate objects are displayed to sequentially alternately appear in a predetermined direction on the morphing interface 520, each of slots of the morphing interface 520 may be controlled to display a single candidate object. The first user may select a single candidate object using a selection control of each of the slots. The selection control may be, for example, a control to activate a "select" button 522 configured to allow a user to select the slot 521 from at least one slot.

In another example, when a predetermined period of time elapses from a point in time at which the morphing control is received (for example, a point in time at which an operation of displaying candidate objects placed in a line so that the candidate objects sequentially alternately appear in a predetermined direction starts), the game server may select at least one candidate object from the displayed candidate objects compulsively (for example, regardless of whether a user control is performed), and may display the at least one selected candidate object on each of the slots. The game server may compulsively determine, as a second object, one of the at least one selected candidate object.

In the present disclosure, a control to activate a predetermined button or a predetermined object may include, for example, a mouse click, a keyboard entry, or a control to touch a corresponding interface point.

Figure 5B:
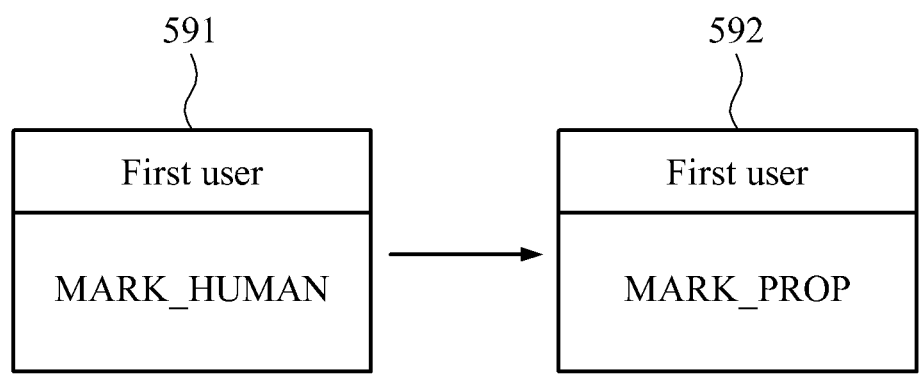
FIGS. 5B through 5D illustrate examples of a parameter of an object corresponding to a first user according to one or more implementations of the present disclosure.
Figure 5C:
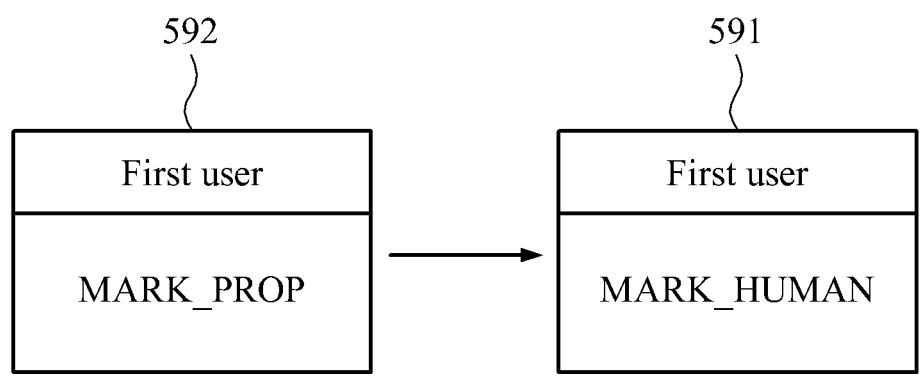
Figure 5D:
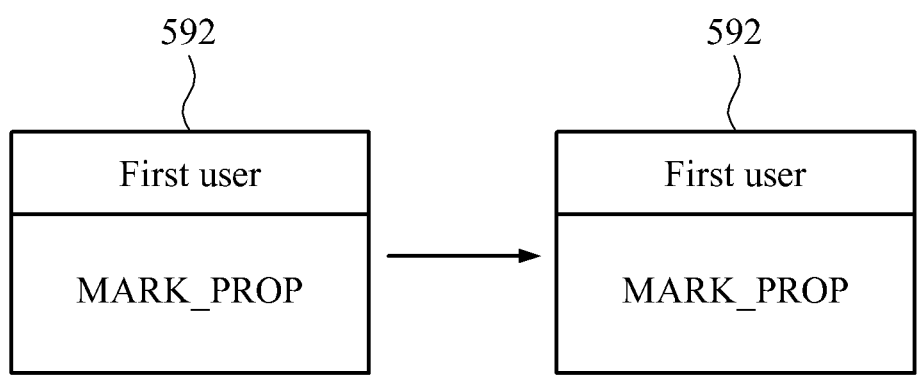

FIGS. 5B through 5D illustrate examples of a parameter of an object corresponding to a first user according to one or more implementations of the present disclosure. In FIGS. 5B through 5D, attribute parameters indicating attributes of the object may be shown as parameters of the object for convenience of description, however, there is no limitation to the attribute parameters. According to one or more implementations, the object may further include other parameters based on a design.

An attribute of an object may include, for example, a human attribute and an inanimate object attribute. The human attribute may indicate an appearance of an object corresponding to a human, and the inanimate object attribute may indicate an appearance of an object corresponding to an inanimate object. In FIGS. 5B through 5D, the human attribute and the inanimate object attribute may be represented by, for example, "MARK HUMAN" and "MARK PROP," respectively. However, a type of attributes of the object may not be limited to the human attribute and the inanimate object attribute and accordingly, another attribute may be further added based on a design. For example, an attribute of each of inanimate objects positioned in a virtual world may be set as a background attribute indicating a background.

According to one or more implementations, a function assigned to an object may be defined based on each of attributes of the object. In an example, a user terminal or a game server may define an object with a human attribute to be allowed to perform an attack function to cause a change in a state of another user, and a system function. The attach function may include, for example, an attack using a knife, a gun or a grenade, and the system function may include, for example, a function to purchase or change weapons.

In another example, the user terminal or the game server may define an object with an inanimate object attribute to be allowed to perform a freezing function to enter a freezing mode and an observing function to enter an observer mode. The freezing function is further described with reference to FIGS. 9A and 9B, and the observing function is further described with reference to FIGS. 10A through 12. In the freezing mode, the object may be fixed in a predetermined perspective at a predetermined position. The attack function and the system function assigned to the human attribute may not be allowed for the inanimate object attribute.

A unique function may be assigned to each of the above-described attributes. A unique function assigned to an arbitrary attribute may not be allowed for an object with another attribute. For example, the attack function and the system function may be set as functions of a human attribute only, and the freezing function and the observing function may be set as functions of an inanimate object attribute only. However, a unique function assigned to each attribute may not be limited to the above-described functions, and may be changed, deleted and added based on a design. Additionally, a morphing function may be allowed as a common function of the human attribute and the inanimate object attribute.

According to one or more implementations, a processor may determine whether each function is a unique function, based on an attribute parameter. Based on a current attribute parameter, the processor may restrict functions other than the unique function, and may add the unique function.

FIG. 5B illustrates an example in which the user terminal or the game server changes a first object 591 corresponding to the first user to a second object 592 corresponding to the first user, and FIG. 5C illustrates an example in which the user terminal or the game server changes the second object 592 to the first object 591. FIG. 5D illustrates an example in which the user terminal or the game server changes the second object 592 to another second object 592. An attribute parameter of the first object 591 may indicate a human attribute, and an attribute parameter of the second object 592 may indicate an inanimate object attribute.

In the example of FIG. 5B, the user terminal or the game server may change an attribute parameter of an object corresponding to the first user from "MARK HUMAN" to "MARK PROP." In the example of FIG. 5C, the user terminal or the game server may change the attribute parameter from "MARK PROP" to "MARK HUMAN." In the example of FIG. 5D, the user terminal or the game server may maintain the attribute parameter as "MARK PROP."

According to one or more implementations, an input receiver may receive, from a first user, a user control to activate a function of an object. For example, when the input receiver is a keyboard, a key input may be received. The user control received from the first user may be matched to a predetermined function based on a predetermined function list. A processor may convert the received user control to a corresponding instruction based on the function list.

When the attribute parameter changes as shown in FIGS. 5B through 5D, a function matched to a user control may also change based on the changed attribute parameter. For example, a function list may be set in advance so that a function assigned to a predetermined user control may be determined based on the attribute parameter.

For example, in response to the first user entering a predetermined key of a keyboard as an input receiver, the user terminal or the game server may activate the system function while an object corresponding to the first user indicates the human attribute, and may activate the freezing function while the object indicates the inanimate object attribute. However, matching between a user control and a function for each attribute may not be limited thereto, and may be changed based on a design.

Figure 6:
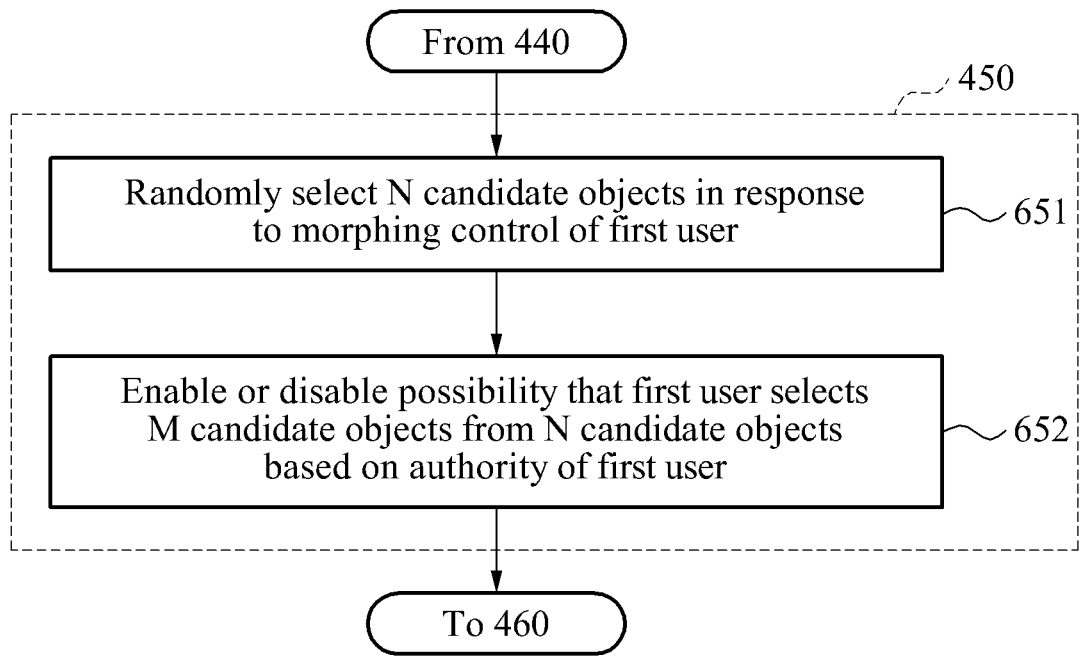

FIGS. 6 and 7 illustrate an example of selecting a candidate object according to one or more implementations of the present disclosure. FIG. 6 illustrates an example of operation 450 of FIG. 4.

Referring to FIG. 6, in operation 651, the game server may randomly select N candidate objects, in response to the morphing control of the first user. N may be an integer equal to or greater than "2."

In operation 652, the game server may enable or disable a possibility that the first user selects M candidate objects from the N candidate objects based on an authority of the first user. M may be an integer equal to or less than N and equal to or greater than "1." In an example, when the possibility is enabled, the first user may be allowed to select the M candidate objects. In another example, when the possibility is disabled, the first user may not be allowed to select the M candidate objects.

The authority may be, for example, an authority that is set to a first user account corresponding to the first user to access the M candidate objects. For example, the authority may be set based on whether payment on the first user account is performed in association with the possibility to select the M candidate objects. When the first user pays to unlock the M candidate objects, the possibility may be enabled. When the first user does not pay, the possibility may be maintained in a disabled state. Payment may be, for example, payment with in-game money or cash. According to one or more implementations, during a game, a possibility to select candidate objects a user in one group desires to morph may be enabled or disabled based on whether payment is performed. The possibility may be enabled and disabled based on whether payment is performed and thus, a user's payment may be induced. Based on an induction of the user's payment, a profit of a service provider may increase.

FIG. 7 illustrates an example of a game screen 500 in which N and M are set to "3" and "1," respectively. For example, in a morphing interface 520 of FIG. 7, a possibility to select a slot 721 may be disabled. In this example, the first user may attempt to activate a "select" button 722 for the slot 721, however, the above access may not be allowed.

Additionally, to select candidate objects other than the M candidate objects, the first user may control the first user terminal to reselect candidate objects. For example, in response to a reselection control (for example, an activation of a "refresh" button 723) being received from the first user, the game server may select other M candidate objects and may provide the selected M candidate objects to the first user terminal. The reselection control may be activated, for example, when payment with in-game money or cash is made.

Figure 8A:
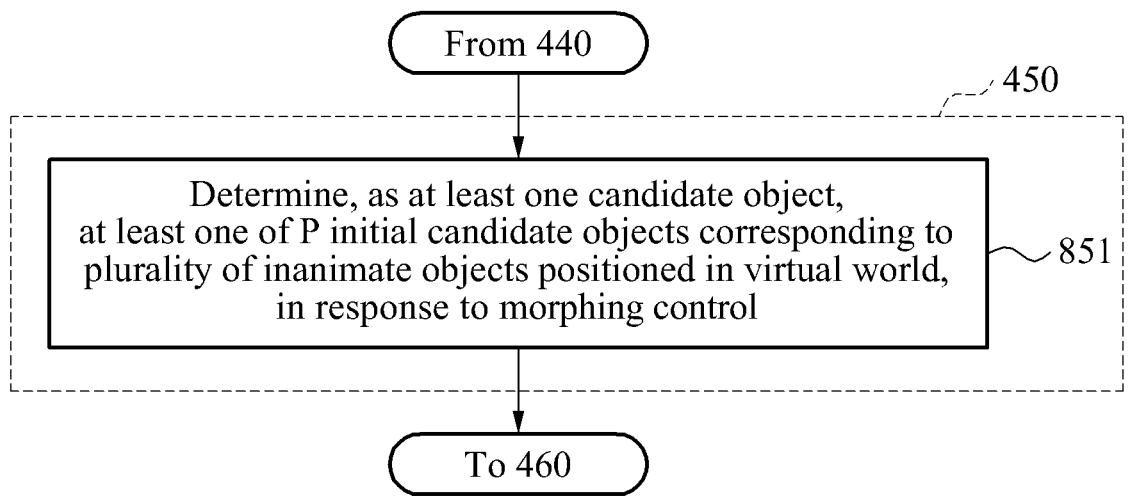
FIGS. 8A through 8D are flowcharts illustrating an example of selecting a candidate object according to one or more implementations of the present disclosure.
Figure 8B:
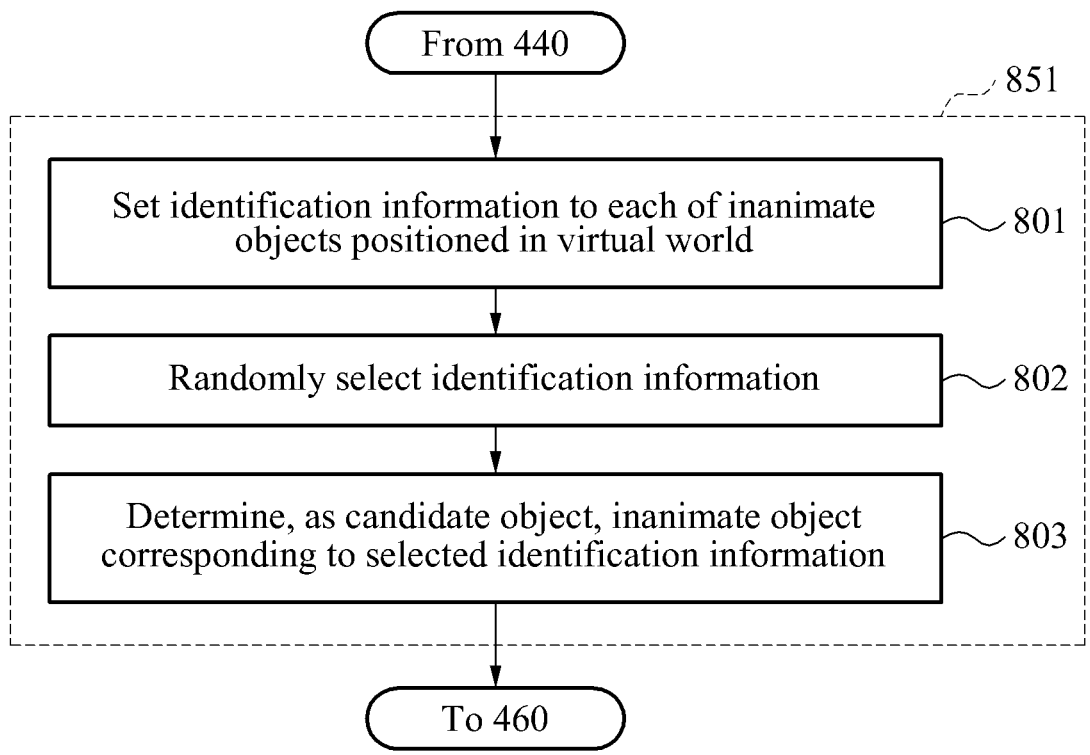

FIGS. 8A through 8B are flowcharts illustrating an example of selecting a candidate object according to one or more implementations of the present disclosure. FIG. 8A illustrates another example of operation 450 of FIG. 4.

Referring to FIG. 8A, in operation 851, in response to the morphing control, the game server may determine, as at least one candidate object, at least one of P initial candidate objects corresponding to a plurality of inanimate objects positioned in the virtual world, where P is an integer.

The inanimate objects may be objects that are not playable, that are positioned in a map of the virtual world and that are distinguished from the map and structure objects. The inanimate objects may include, for example, a desk, a television (TV), a ladder, a chair, a refrigerator, a statue, a fish or a bird in the virtual world. The initial candidate objects may be a plurality of inanimate objects positioned in the virtual world.

FIG. 8B illustrates an example of operation 851 of FIG. 8A.

Referring to FIG. 8B, in operation 801, the game server may set identification information to each of the inanimate objects positioned in the virtual world. For example, the game server may set identification information to each of the inanimate objects in the virtual world, and may generate a candidate object list based on the set identification information. The identification information may include, for example, an index indicating each of the inanimate objects. For example, when "$L_1+1$" inanimate objects are placed in the virtual world, indices "0" through "$L_1$" may be set and $L_1$ may be an integer equal to or greater than "0." The game server may set identification information to a portion or all of the inanimate objects in the virtual world.

In operation 802, the game server may randomly select the identification information. For example, the game server may randomly select a single value from "0" through "$L_1$." The game server may select an index $K_1$ in which $K_1$ is an integer equal to or greater than "0" and equal to or less than $L_1$.

Figure 8C:
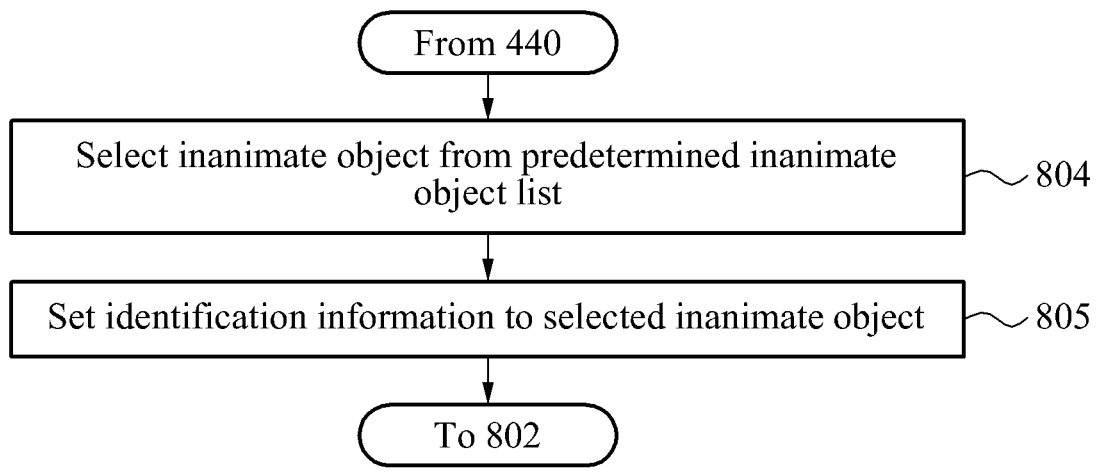
Figure 8D:
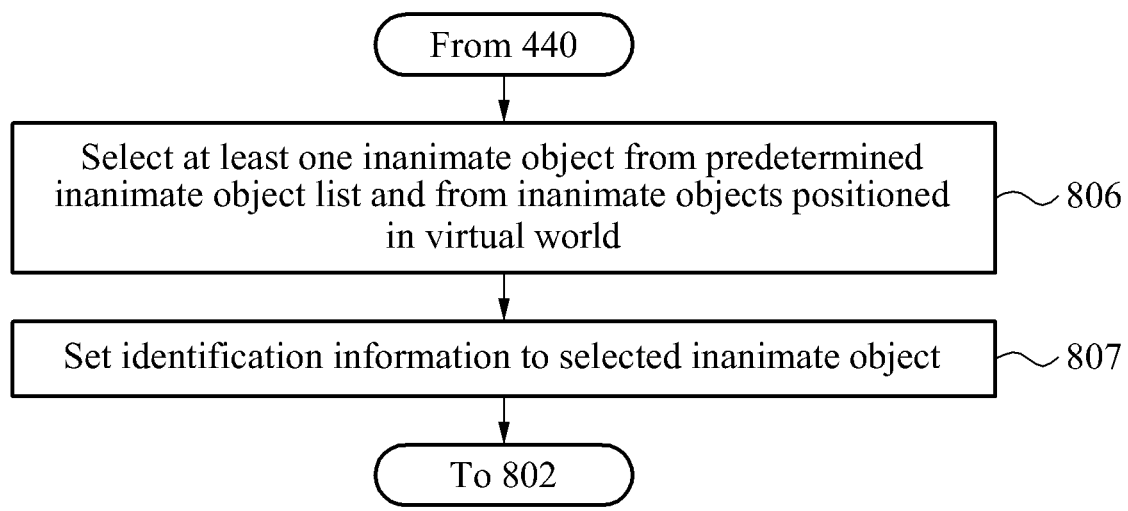

In operation 803, the game server may determine, as a candidate object, an inanimate object corresponding to the selected identification information. For example, the game server may determine, as a candidate object, an inanimate object corresponding to the index $K_1$ selected in operation 802. In FIGS. 8C and 8D, inanimate objects corresponding to indices $K_2$ and $K_3$ may be selected.

FIG. 8C illustrates another example of operation 851.

Referring to FIG. 8C, in operation 804, the game server may select an inanimate object from a predetermined inanimate object list. The inanimate object list may be arbitrarily generated by a service provider. For example, the inanimate object list may be generated so that an extremely small inanimate object or an inanimate object with a low interest may be excluded from the virtual world. Also, the inanimate object list may be generated to include a separate inanimate object that is not included in the virtual world. The game server may select a portion or all of inanimate objects from the inanimate object list.

In operation 805, the game server may set identification information to the selected inanimate object. For example, when "$L_2+1$" inanimate objects are selected, indices "0" through "$L_2$" may be set as identification information and $L_2$ may be an integer equal to or greater than "0." Similarly to operation 802 of FIG. 8B, the game server may randomly select the identification information. For example, the game server may randomly select a single value from "0" through "$L_2$." The game server may select the index $K_2$ in which $K_2$ is an integer equal to or greater than "0" and equal to or less than $L_2$.

FIG. 8D illustrates still another example of operation 851.

Referring to FIG. 8D, in operation 806, the game server may select at least one inanimate object from a predetermined inanimate object list and from inanimate objects positioned in the virtual world. For example, the game server may select a portion or all of inanimate objects from the inanimate object list, and may select a portion or all of the inanimate objects in the virtual world.

In operation 807, the game server may set identification information to the selected inanimate object. For example, when "$L_{3+1}$" inanimate objects are selected, indices "0" through "$L_3$" as identification information may be set and $L_3$ may be an integer equal to or greater than "0." Similarly to operation 802 of FIG. 8B, the game server may randomly select the identification information. For example, the game server may randomly select a single value from "0" through "$L_3$." The game server may select the index $K_3$ in which $K_3$ is an integer equal to or greater than "0" and equal to or less than $L_3$.

Figure 9A:
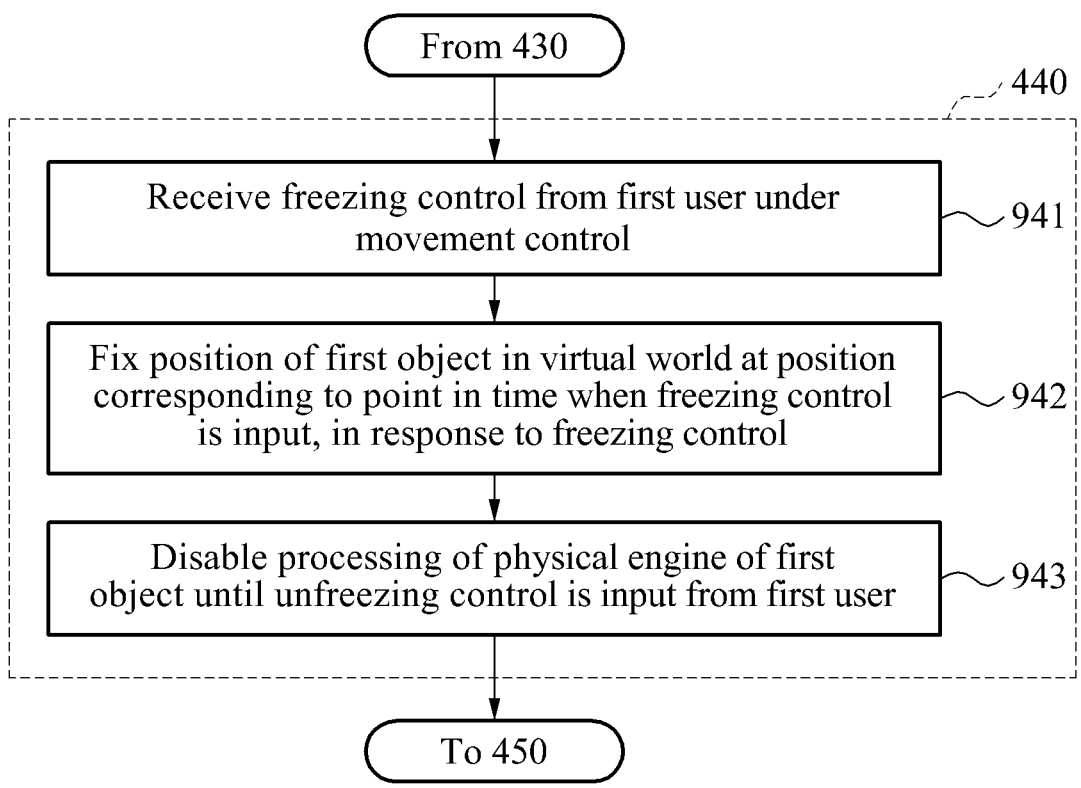
FIG. 9A is a flowchart illustrating an example of a method of controlling a movement of an object described with reference to the method of FIG. 4.

FIG. 9A is a flowchart illustrating an example of a method of controlling a movement of an object described with reference to the method of FIG. 4.

FIG. 9A illustrates an example of operation 440.

Figure 10A:
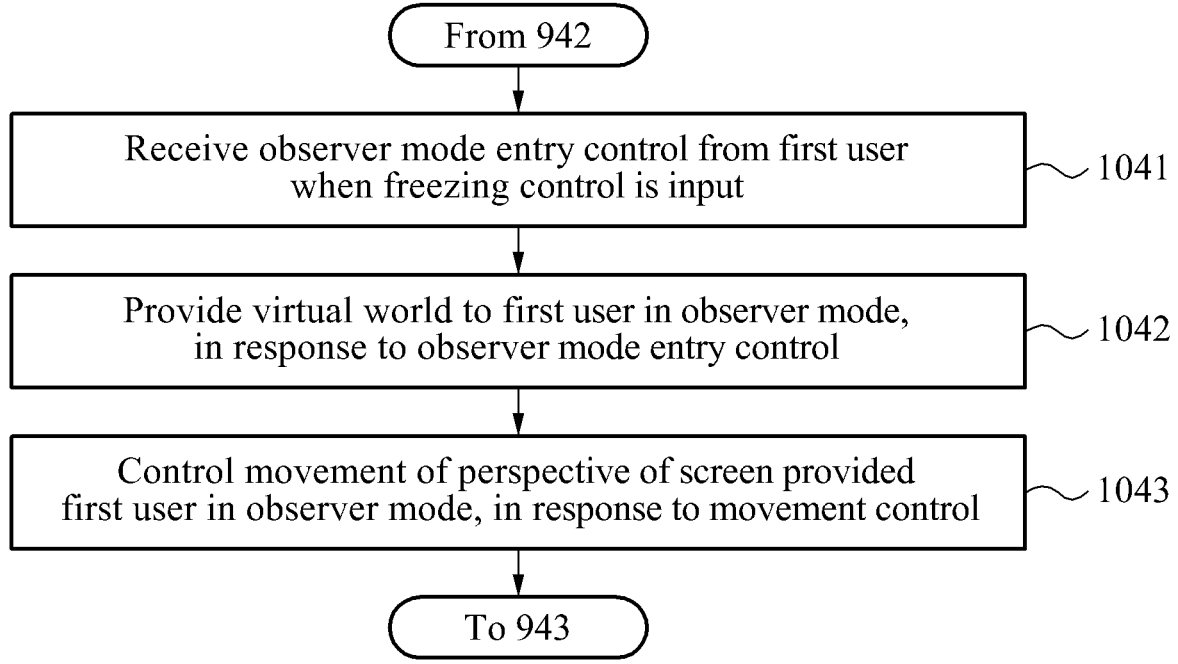

Referring to FIG. 9A, in operation 941, the game server may receive a freezing control from the first user under the movement control. For example, when an input of the freezing control is received, the first user terminal may transmit the freezing control to the game server. The freezing control may be, for example, a control to fix a position of the first object. For example, in response to the freezing control being received, the game server may allow the first user terminal to enter a freezing mode in which a position of an object corresponding to the first user is fixed. The freezing mode may correspond to a unique function assigned to an inanimate object attribute. In addition, in the freezing mode, a perspective provided to the first user terminal may be limited based on the position of the first object. In the freezing mode, when an observer mode entry control is additionally received, an entry to an observer mode may be performed as shown in FIG. 10A.

The object corresponding to the first user may further include a freezing parameter that may be represented, for example, by "MARK FREEZING" For example, when the first user terminal enters the freezing mode, the freezing parameter may be activated. When the freezing mode is terminated, the freezing parameter may be deactivated. In the observer mode, the freezing parameter may also be activated.

In operation 942, the game server may fix the position of the first object in the virtual world at a position corresponding to a point in time when the freezing control is input, in response to the freezing control. For example, when the freezing control is input, the game server may ignore the movement control received from the first user and may not change the position of the first object (for example, coordinates in the virtual world). The game server may determine whether the position of the first object is to be updated for each frame of a display based on the freezing parameter corresponding to the first user. The freezing parameter may be activated in operation 941 and accordingly, the movement control may be ignored and the position of the first object may not be updated in operation 942.

In operation 943, the game server may disable processing of a physical engine of the first object until an unfreezing control is input from the first user. For example, when the freezing control is input, the game server may control the first user terminal to exclude an operation of the position of the first object by the physical engine until the unfreezing control is input.

In an example in which the first object is floating in the air in the virtual world due to a jump or drop, when the freezing control is input, the game server may fix the position of the first object at the position corresponding to the point in time when the freezing control is input and may maintain the position until the unfreezing control is input. In another example in which the first object is positioned in a place in which water flows and in a windy place, when the freezing control is input, the game server may also fix the position of the first object at the position corresponding to the point in time when the freezing control is input and may maintain the position until the unfreezing control is input.

In this example, in response to the freezing mode being terminated, that is, the unfreezing control being input, the position of the first object may be updated from the position of the first object fixed in operation 942, based on at least one of the movement control and an application of the physical engine. Accordingly, the position of the first object in the freezing mode and the position of the first object immediately after the freezing mode is terminated may be continuous.

According to one or more implementations, during a game, a user in one group may freeze an object corresponding to the user and may enter an observer mode. In the observer mode, the user may observe the other users, and may maintain an interest in the game. Additionally, a plurality of users may freeze objects corresponding to the users and may be allowed to observe a progress of a game of the other users and accordingly, it is possible to guide a participation of a larger number of users. Also, it is possible to reduce a processing load of a system by interrupting a physical operation of a character of each of users freezing objects corresponding to the users.

The first object of FIG. 9A is merely an example, however, there is no limitation thereto. For example, a position of the second object may be fixed and moved under the freezing control and the unfreezing control.

Figure 9B:
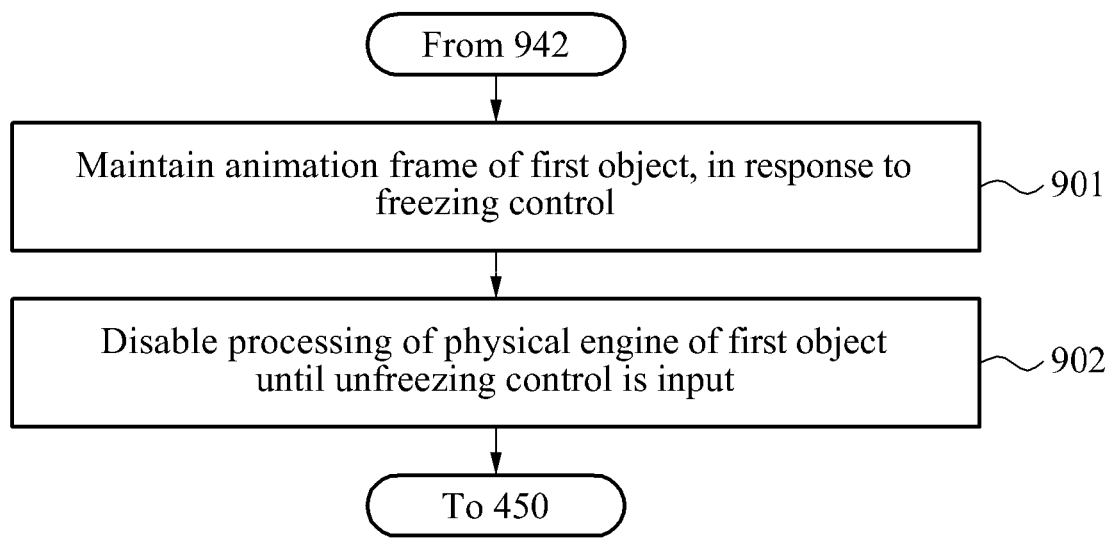
FIG. 9B is a flowchart illustrating an example of a method of controlling a frame of an object according to one or more implementations of the present disclosure.

FIG. 9B is a flowchart illustrating an example of a method of controlling a frame of an object according to one or more implementations of the present disclosure. Referring to FIG. 9B, in operation 901, the user terminal or the game server may maintain an animation frame of the first object, in response to the freezing control. For example, the game server may determine whether the animation frame is to be updated based on the freezing parameter of the first object. In response to the freezing control being received, the game server may activate the freezing parameter of the first object and may interrupt updating of the animation frame. The animation frame may be, for example, a frame assigned to each object to be played back every frame of a display in modes other than the freezing mode.

In operation 902, the user terminal or the game server may disable processing of the animation frame until the unfreezing control is input. For example, when the unfreezing control is input, the freezing mode may be terminated, the user terminal may play back the animation frame from a point in time at which the animation frame is frozen in operation 901. Accordingly, the animation frame in the freezing mode, and an animation frame of the first object immediately after the freezing mode is terminated may be consecutive. Thus, it is possible to naturally play back animation frames of an object instead of having a sense of incompatibility, before and after the freezing mode is terminated. In addition, a playback of animation frames of frozen characters of users may be interrupted and thus, it is possible to reduce a processing load of a system.

Figure 10B:
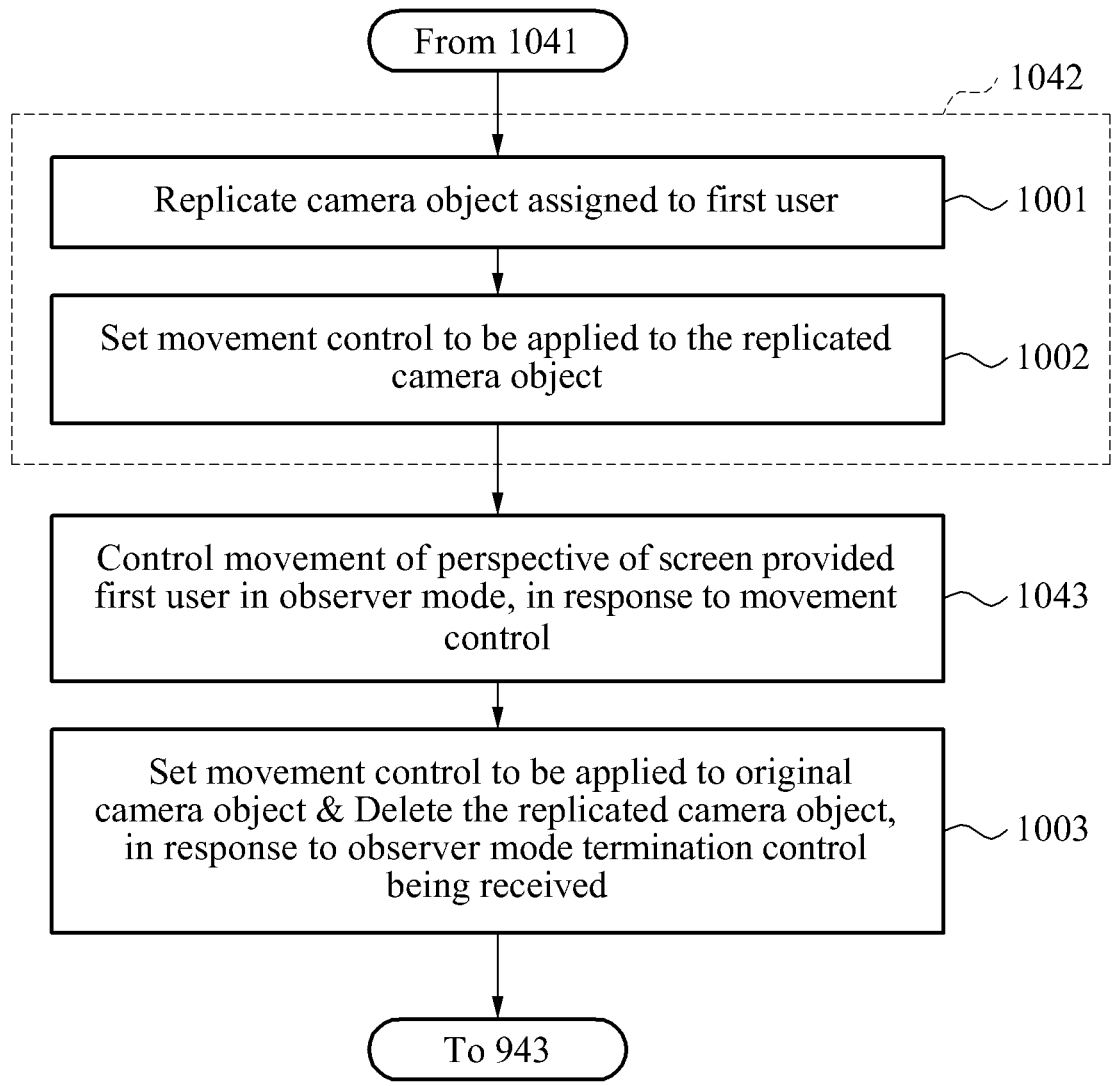

FIGS. 10A through 10C illustrate examples of providing an object in an observer mode according to one or more implementations of the present disclosure.

FIG. 10A is an example of a flowchart illustrating a method of providing a first user with the observer mode.

Referring to FIG. 10A, in operation 1041, the first user terminal may receive an observer mode entry control from the first user when the freezing control is input. For example, the first user terminal may receive a control defined as an observer mode entry control from the first user through an input receiver. When first state information corresponding to the first user is changed to indicate a death state in which playing a game is not possible, the observer mode entry control may be generated and may be transferred from the first user terminal to the game server.

In operation 1042, the first user terminal may provide the virtual world to the first user in an observer mode, in response to the observer mode entry control. The observer mode may provide the first user terminal with a perspective regardless of a position of the first object or the second object. In the observer mode, the first user may change the perspective through a movement control, or a screen of a game in a perspective of another first user may be provided to the first user.

According to one or more implementations, in the observer mode, a freezing parameter of an object corresponding to the first user may be activated. Also, in the observer mode, only a position of a camera object may change while an animation frame and a position of the object corresponding to the first user are maintained. The camera object may provide a perspective of a screen provided to the first user terminal. In the observer mode, the object corresponding to the first user may be attacked by the second user, or a physical operation may be applied to the object corresponding to the first user. The observer mode may correspond to a unique function assigned to an inanimate object attribute.

In operation 1043, the first user terminal may control a movement of a perspective of a screen provided to the first user in the observer mode, in response to the movement control. For example, during a period between a point in time when the freezing control is input in operation 942 of FIG. 9A and a point in time when the unfreezing control is input, the movement control may be set to move a perspective of a game screen provided to the first user terminal, instead of changing a position of the first object or the second object.

In response to an observer mode termination control being received from the first user, the first user terminal may restore the perspective to a perspective set immediately before the first user terminal enters the observer mode.

FIG. 10B is a flowchart illustrating an example of the method of FIG. 10A. Operation 1042 of FIG. 10A may include operations 1001 and 1002.

Referring to FIG. 10B, in operation 1001, the first user terminal may replicate a camera object assigned to the first user. The camera object may be, for example, an object used to determine a perspective of a screen provided to the first user terminal. Basically, the camera object may be moved and controlled in association with an object corresponding to the first user.

In operation 1002, the first user terminal may set a movement control that is to be received, to be applied to the replicated camera object. For example, the first user terminal may change an object to which a movement control is applied from the original camera object to the replicated camera object. The original camera object and the replicated camera object may exist independently of each other.

In operation 1043, the first user terminal may control a movement of a perspective of a screen provided to the first user in the observer mode, in response to the movement control. For example, the first user may move the perspective of the screen using the replicated camera object. Operation 1043 of FIG. 10A has been already described and accordingly, further description is omitted.

In operation 1003, the first user terminal may set the movement control to be applied to the original camera object and may delete the replicated camera object, in response to an observer mode termination control being received. For example, when the observer mode is terminated, the perspective may be restored to the original perspective associated with a position of the original camera object, for example, the object corresponding to the first user.

FIG. 10C is a flowchart illustrating another example of the method of FIG. 10A. Operation 1042 of FIG. 10A may include operations 1004 and 1005.

Referring to FIG. 10C, in operation 1004, the first user terminal may replicate the original object and may fix a position of the replicated object. For example, the first user terminal may replicate the original object corresponding to the first user, so that a position of the replicated object corresponding to the first user may be identical to a position of the original object. In this example, the original object and the replicated object may be separate from each other, and the original camera object associated with the original object and the replicated camera object associated with the replicated object may also be separate from each other.

In operation 1005, the first user terminal may change a perspective of the original camera object to a free perspective. For example, the first user terminal may apply a movement control received from the first user to the original camera object instead of applying the movement control to the original object.

In operation 1043, the first user terminal may control a movement of a perspective of a screen provided to the first user in the observer mode, in response to the movement control. For example, the first user may move the perspective of the screen using the original camera object. Operation 1043 of FIG. 10A has been already described and accordingly, further description is omitted.

In operation 1006, the first user terminal may restore the original object to the position of the replicated object and may reflect a change in a state of the replicated object on the original object, in response to the observer mode termination control being received. For example, the original object and the replicated object may be linked to each other. When the observer mode is terminated, information on the change in the state of the replicated object may be reflected on the original object, and may be updated.

Figure 11:
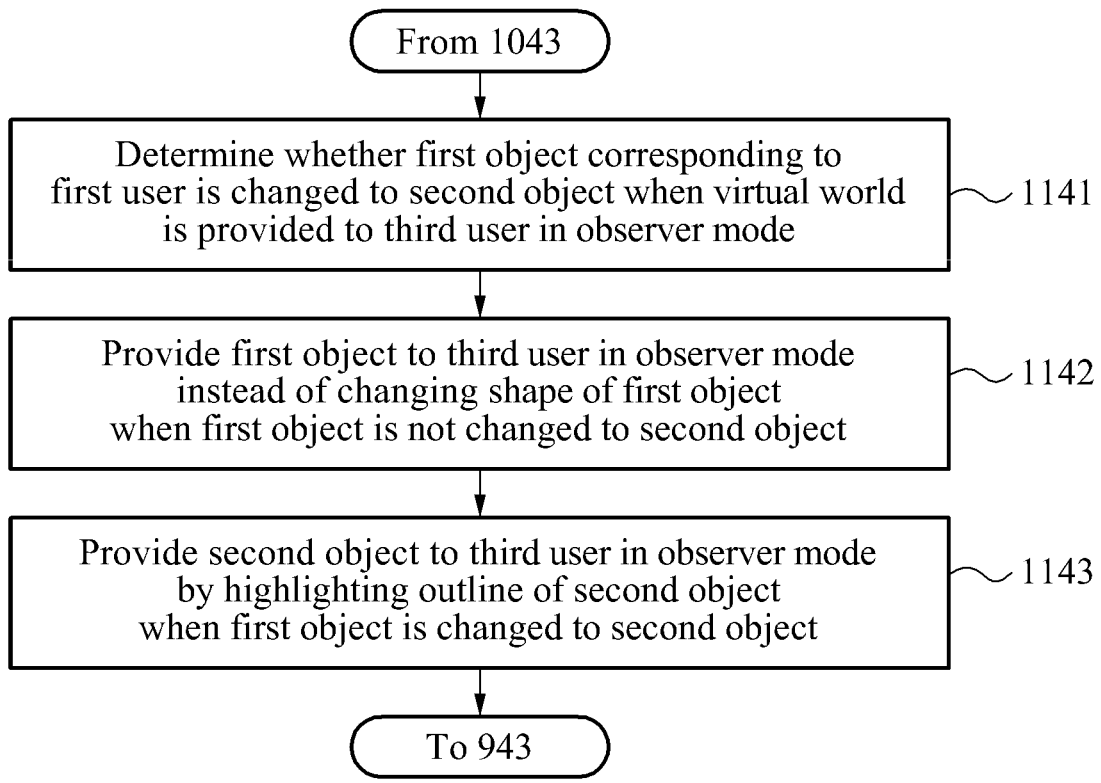
FIGS. 11 and 12 illustrate another example of providing an object in an observer mode according to one or more implementations of the present disclosure.
Figure 12:
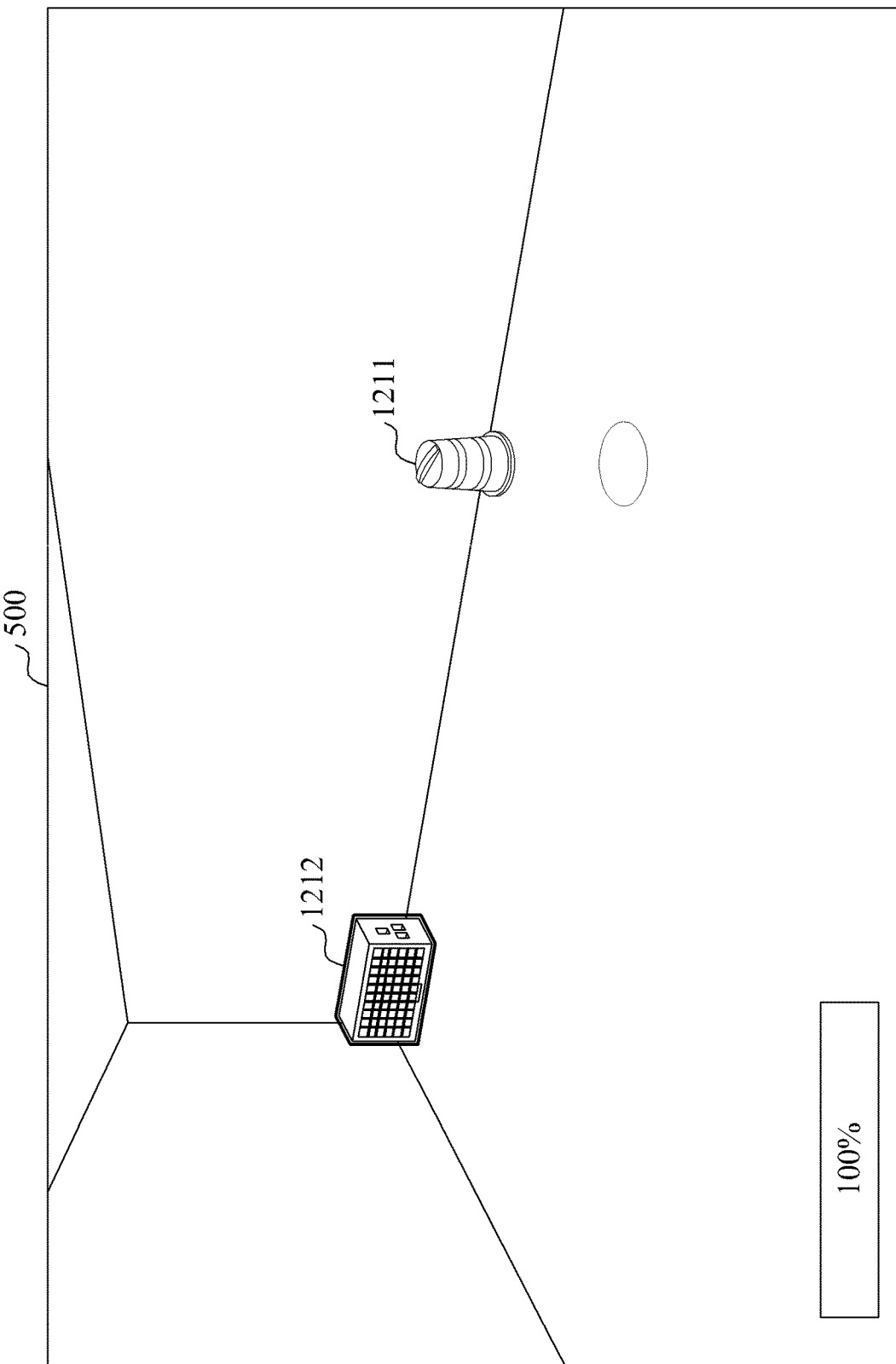

FIGS. 11 and 12 illustrate another example of providing an object in an observer mode according to one or more implementations of the present disclosure. FIG. 11 is an example of a flowchart illustrating a process of providing a first object corresponding to a first user to a third user in the observer mode by highlighting the first object.

Referring to FIG. 11, when a virtual world is provided to the third user in the observer mode, a game server may determine whether the first object is changed to a second object in operation 1141. The third user may be, for example, a user in the same group as the first user and may be referred to as another first user.

When the first object is not changed to the second object, the game server may provide the first object to the third user in the observer mode instead of changing a shape of the first object in operation 1142. For example, when the first user does not change the first object, the first object may be displayed to the third user without a change.

When the first object is changed to the second object, the game server may highlight an outline of the second object and may provide the second object to the third user in the observer mode in operation 1143. For example, the game server may control a user terminal of the third user to display the second object by highlighting the outline of the second object so that the third user may easily identify the first user.

The highlighting of the outline of the second object may include, for example, changing a thickness or a color of the outline or marking the outline in bold type.

FIG. 12 illustrates an example of operation 942 of FIG. 9A and an example of operation 1143 of FIG. 11. A game screen 500 of FIG. 12 may be provided to the first user.

Referring to FIG. 12, when a freezing control is received from the first user while a second object 1211 corresponding to the first user is floating in the air under a movement control of the first user in a virtual world, a position of the second object 1211 may be fixed. The second object 1211 may be, for example, an object to which a first object is changed and may be displayed as a drum, as shown in FIG. 12. When the position of the second object 1211 is fixed, the movement control may be set to move a perspective of the game screen 500 provided to a first user terminal. The game screen 500 may be provided in a free perspective instead of a first-person perspective or a third-person perspective of the second object 1211.

Additionally, an outline of an object 1212 corresponding to another first user may be highlighted and displayed on the game screen 500. The object 1212 may be, for example, an object 1212 created by morphing and may be displayed as an outdoor unit of an air conditioner in FIG. 12.

Figure 13:
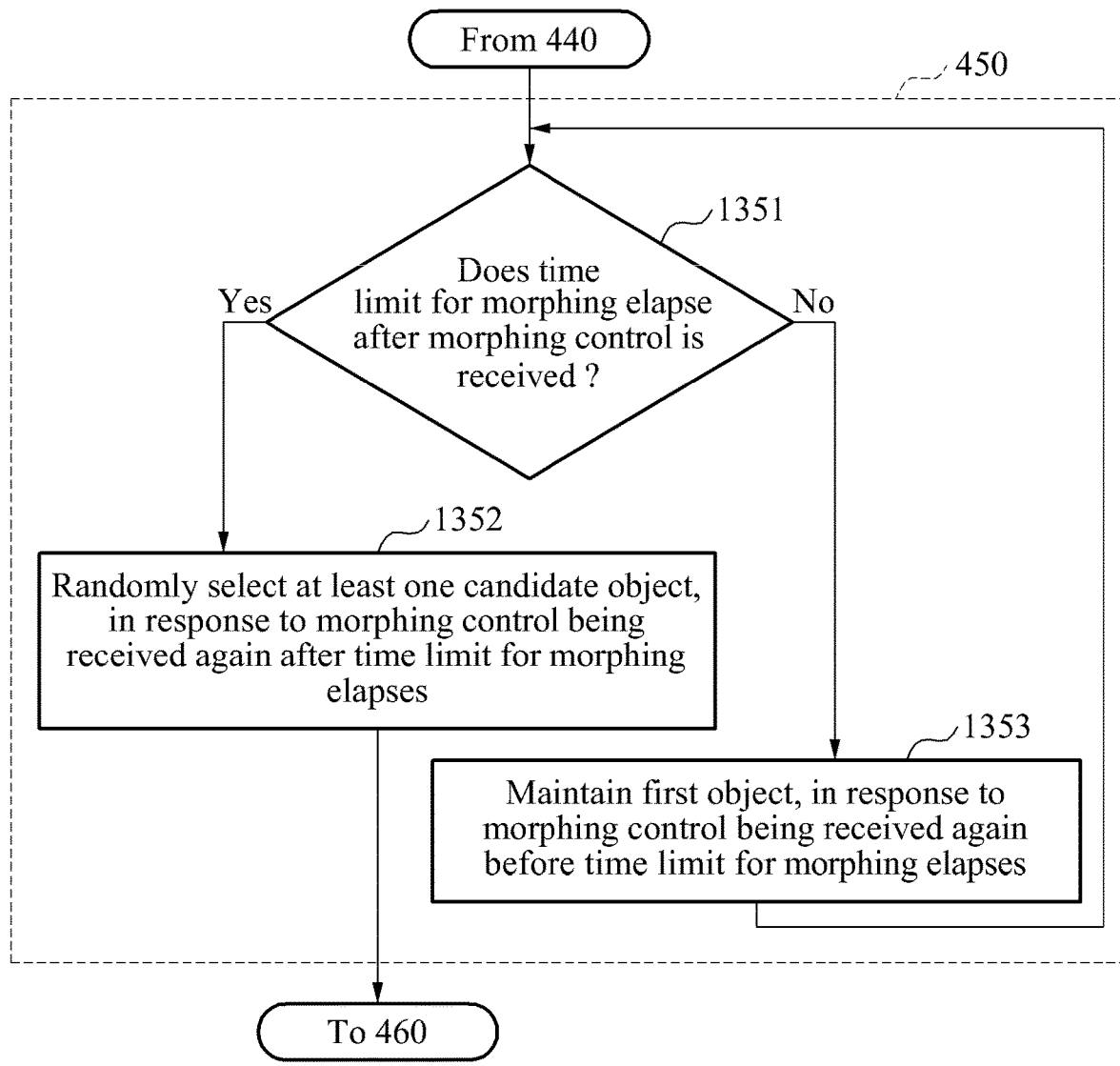
FIGS. 13 and 14 illustrate an example of changing a first object described with reference to the method of FIG. 4.
Figure 14:
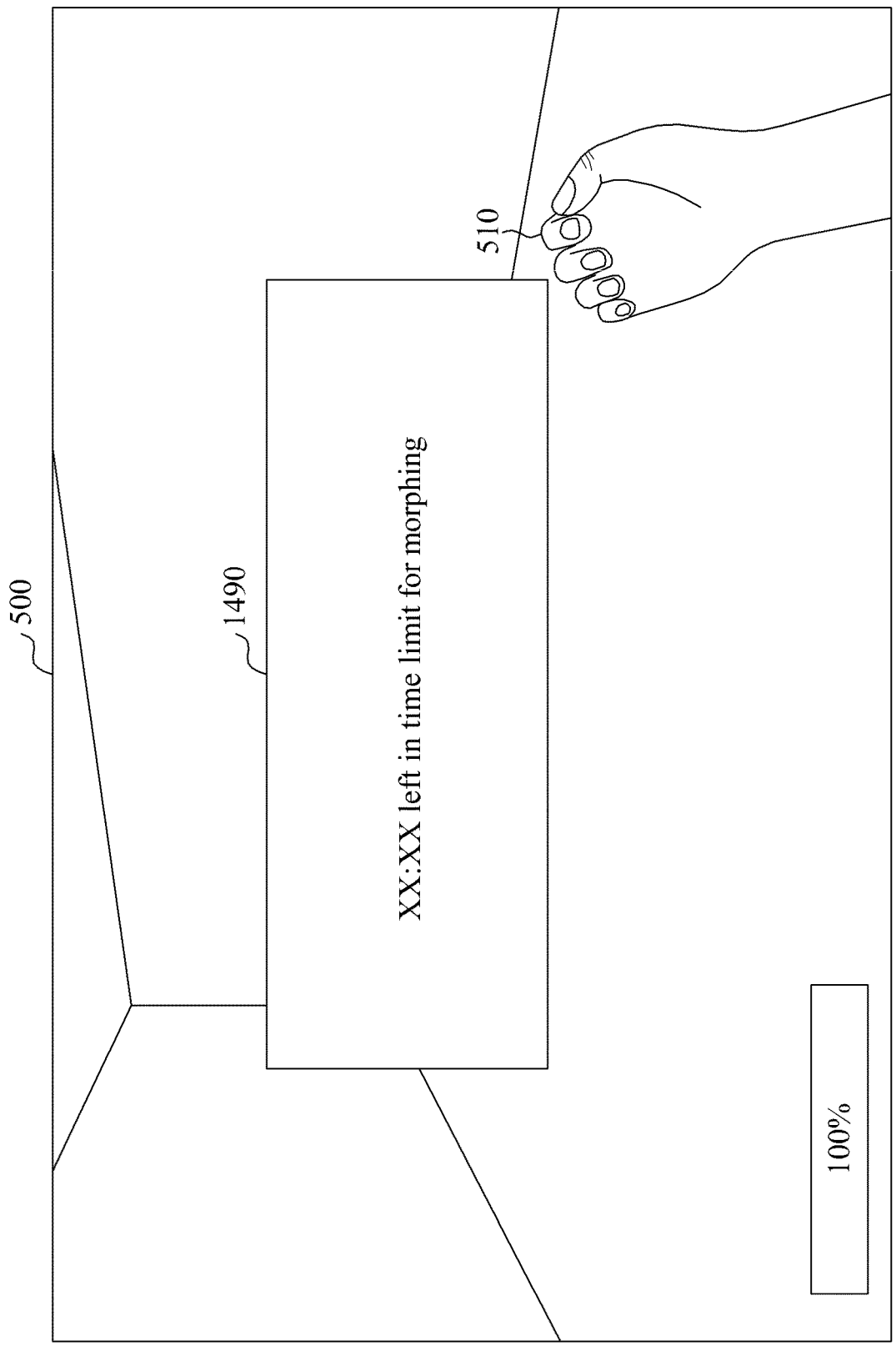

FIGS. 13 and 14 illustrate an example of changing a first object described with reference to the method of FIG. 4 according to one or more implementations of the present disclosure.

FIG. 13 illustrates still another example of operation 450 of FIG. 4.

Referring to FIG. 13, in operation 1351, the game server may determine whether a predetermined time limit for morphing elapses from a point in time at which a previous morphing control is received, in response to the morphing control being received again from the first user. For example, the time limit for morphing may be a period of time during which an operation by which the first user morphs a first object 510 into a second object is limited, and may be set so that morphing may be limited until a predetermined period of time elapses from a previous point in time for morphing.

In operation 1352, the game server may randomly select at least one candidate object, in response to the morphing control being received again after the time limit for morphing elapses.

In operation 1353, the game server may maintain the first object 510, in response to the morphing control being received again before the time limit for morphing elapses. For example, during the time limit for morphing, the game server may ignore the morphing control received from the first user and may maintain the first object 510. The game server may reperform operation 1351 and may wait until the morphing control is received from the first user.

FIG. 14 illustrates an example of a morphing limit interface 1490 displayed when the time limit for morphing does not elapse in operation 1353 of FIG. 13. When the first user attempts to change the first object 510 to the second object before the time limit for morphing elapses, the first user terminal may provide an alarm using the morphing limit interface 1490, as shown in FIG. 14. For example, the morphing limit interface 1490 may visually display the time limit for morphing (for example, an increase or a decrease in a gauge over time) or may numerically display a remaining amount of time.

Figure 15:
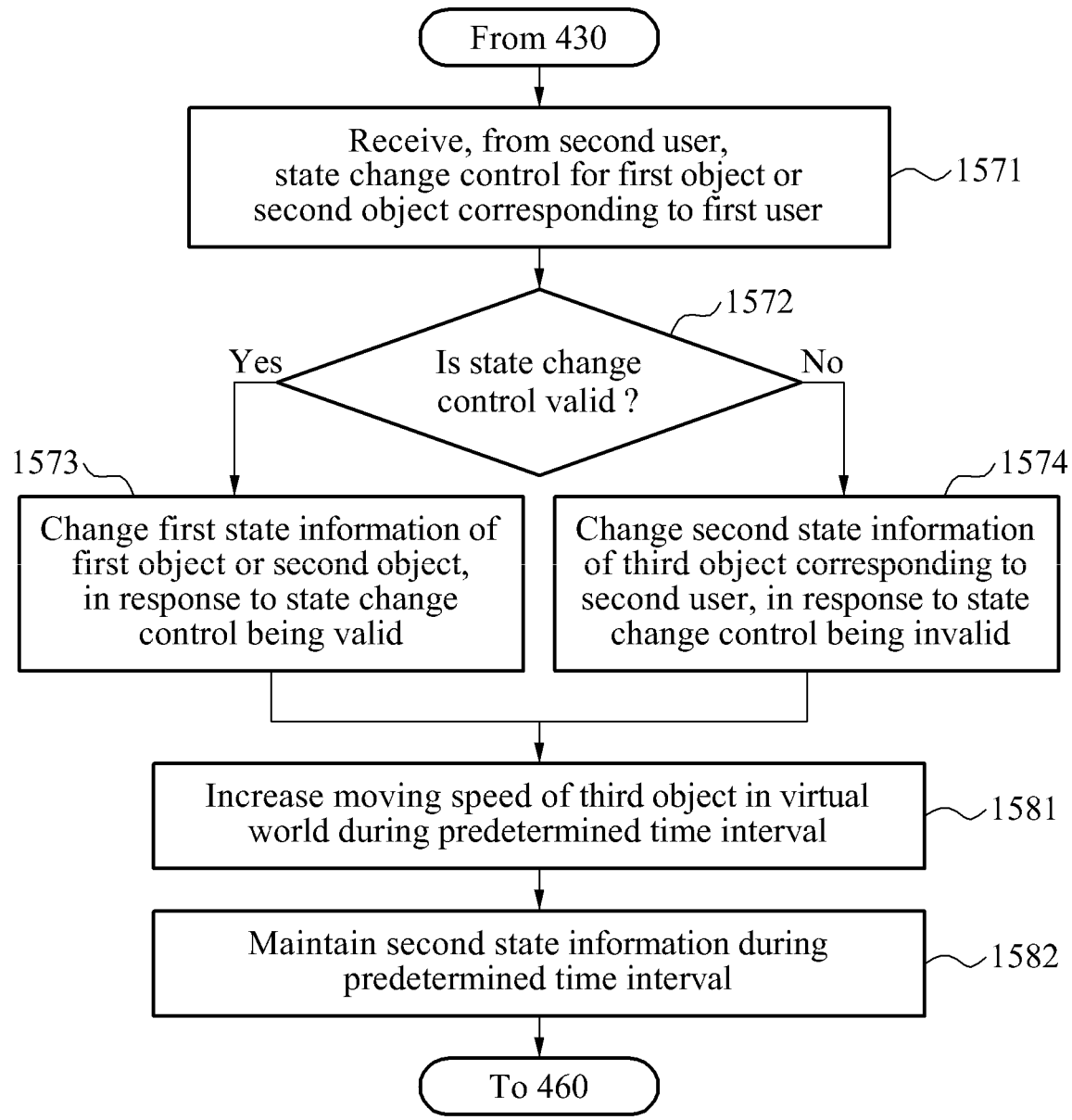
FIGS. 15 and 16 illustrate an example of providing an object in a burning mode according to one or more implementations of the present disclosure.
Figure 16:
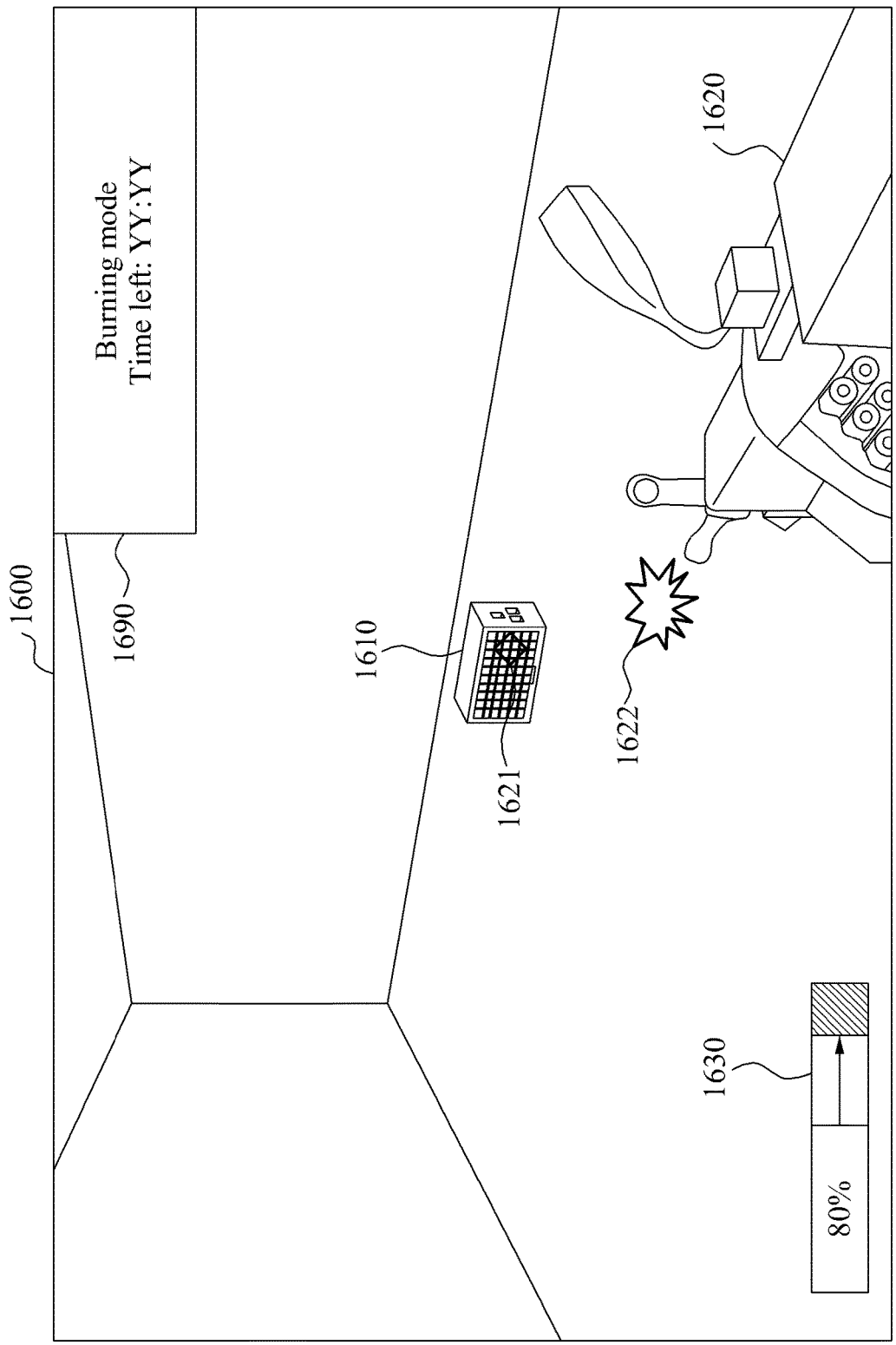

FIGS. 15 and 16 illustrate an example of providing an object in a burning mode according to one or more implementations of the present disclosure.

FIG. 15 is an example of a flowchart illustrating a method of providing an object in a burning mode in a second user terminal, and operations 1571 through 1573, 1581 and 1582 may be performed in parallel to operations 440 through 460 of FIG. 4.

Referring to FIG. 15, in operation 1571, the game server may receive, from the second user, a state change control to change a state of a first object or a second object 1610. The first object or the second object 1610 may correspond to the first user. The state change control may refer to a control of the second user to change first state information corresponding to the first user. The state change control may include, for example, a control of the second user to aim at the first object or the second object 1610 corresponding to the first user using an aim mark 1621 displayed on a game screen 1600 and to allow a third object 1620 corresponding to the second user to attack the first object or the second object 1610 in a first-person shooter (FPS) game as shown in FIG. 16.

In operation 1572, the game server may verify a validity of the state change control. The validity of the state change control may indicate whether the state change control by the second user is valid. The validity of the state change control may include, for example, information regarding whether an attack by the third object 1620 corresponding to the second user on the first object or the second object 1610 in the virtual world in the FPS game succeeds. Additionally, when the attack by the third object 1620 is performed by a projectile in the virtual world in the FPS game, the game server may determine whether the attack on the first object or the second object 1610 succeeds, based on a trajectory calculated by applying an operation of a physical engine to the projectile.

In operation 1573, the game server may change first state information of the first object or the second object 1610, in response to the state change control being valid. For example, when the state change control is valid, an attack by the second user on the first object or the second object 1610 may be determined to succeed, and the game server may change an HP corresponding to the first state information to zero. When the HP reaches zero because the first user is attacked by the second user, the first state information may be changed to indicate a death state so that the first user may not play a game anymore.

In operation 1574, the game server may change second state information 1630 of the third object 1620 corresponding to the second user, in response to the state change control being invalid. The second state information 1630 may include an HP of the third object 1620. For example, when the state change control is invalid, the attack by the second user on the first object or the second object 1610 may be determined to fail, and the game server may reduce the HP corresponding to the second state information 1630 as a penalty for the failing attack.

For example, when a maximum HP corresponding to the second user is set to "100," and when the attack by the second user on the first object or the second object 1610 succeeds, the HP may increase by a value of "number of times the attack succeeds×10." When the attack fails, the HP may decrease by a value of "number of attacks×10." When the HP of the third object 1620 reaches zero, the second state information 1630 may be changed to indicate a death state so that the second user may not play a game anymore.

In operation 1581, the game server may increase a moving speed of the third object 1620 in the virtual world during a predetermined time interval. The predetermined time interval may be, for example, a time interval defined as a burning mode (for example, 30 seconds before an end of a game). A level to which the moving speed of the third object 1620 increases in the virtual world may be determined based on a design.

In operation 1582, the game server may maintain the second state information 1630 during the predetermined time interval. For example, even though the state change control by the second user is invalid in the burning mode, the second state information 1630 may be maintained. In the burning mode, the second user may not receive a penalty of a decrease in the HP regardless of a number of times the attack of by the second user fails.

According to one or more implementations, during a game, a user in one group may enter a burning mode over time and accordingly, stress may be relieved. In addition, it is possible to prevent a single game room from being unlimitedly maintained, by setting a time limit for a game and thus, it is possible to reduce a burden applied to a server.

FIG. 16 illustrates an example of the game screen 1600 displayed on the second user terminal. An attack 1622 by the third object 1620 on the second object 1610 may occur.

When the attack 1622 using the aim mark 1621 succeeds, the HP corresponding to the second state information 1630 may increase.

Information associated with the burning mode may be provided to the second user through the burning mode interface 1690. The burning mode interface 1690 may visually or numerically display a remaining amount of time in the burning mode. In the burning mode, the HP corresponding to the second state information 1630 may not decrease.

Figure 17A:
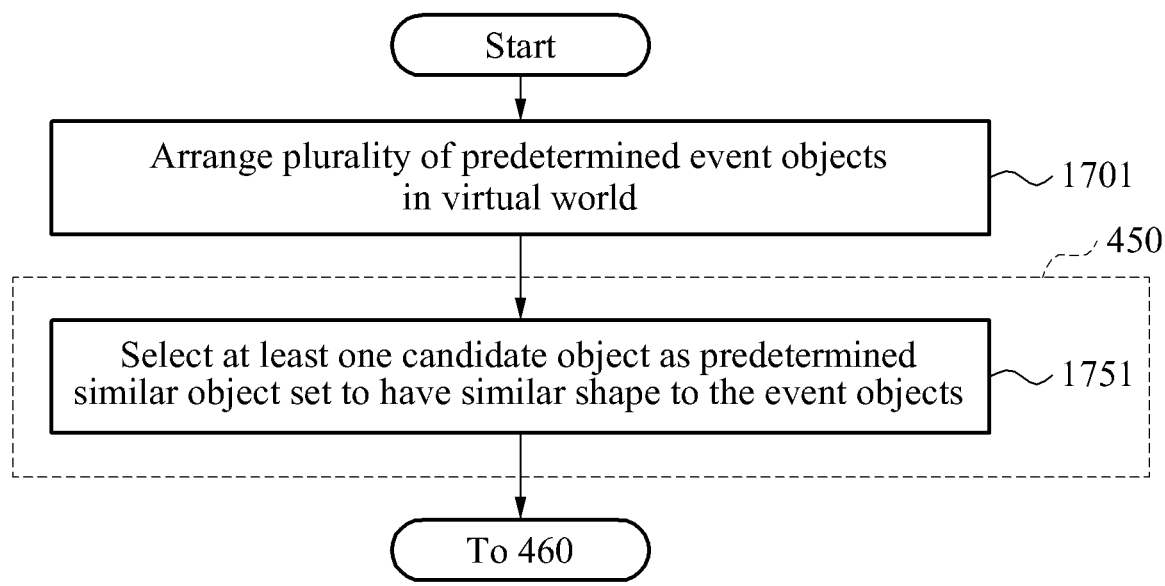
FIGS. 17A, 17B and 18 illustrate an example of providing an event according to one or more implementations of the present disclosure.
Figure 17B:
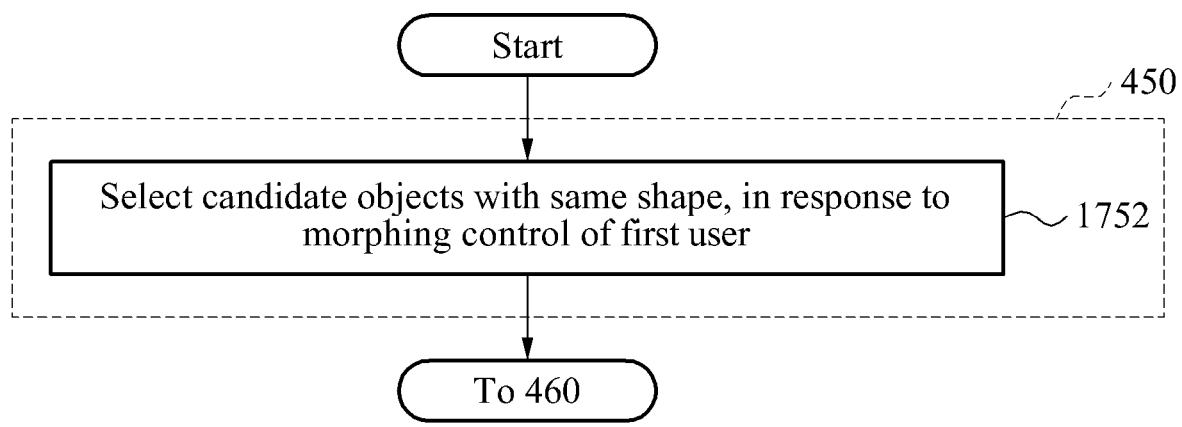
Figure 18:
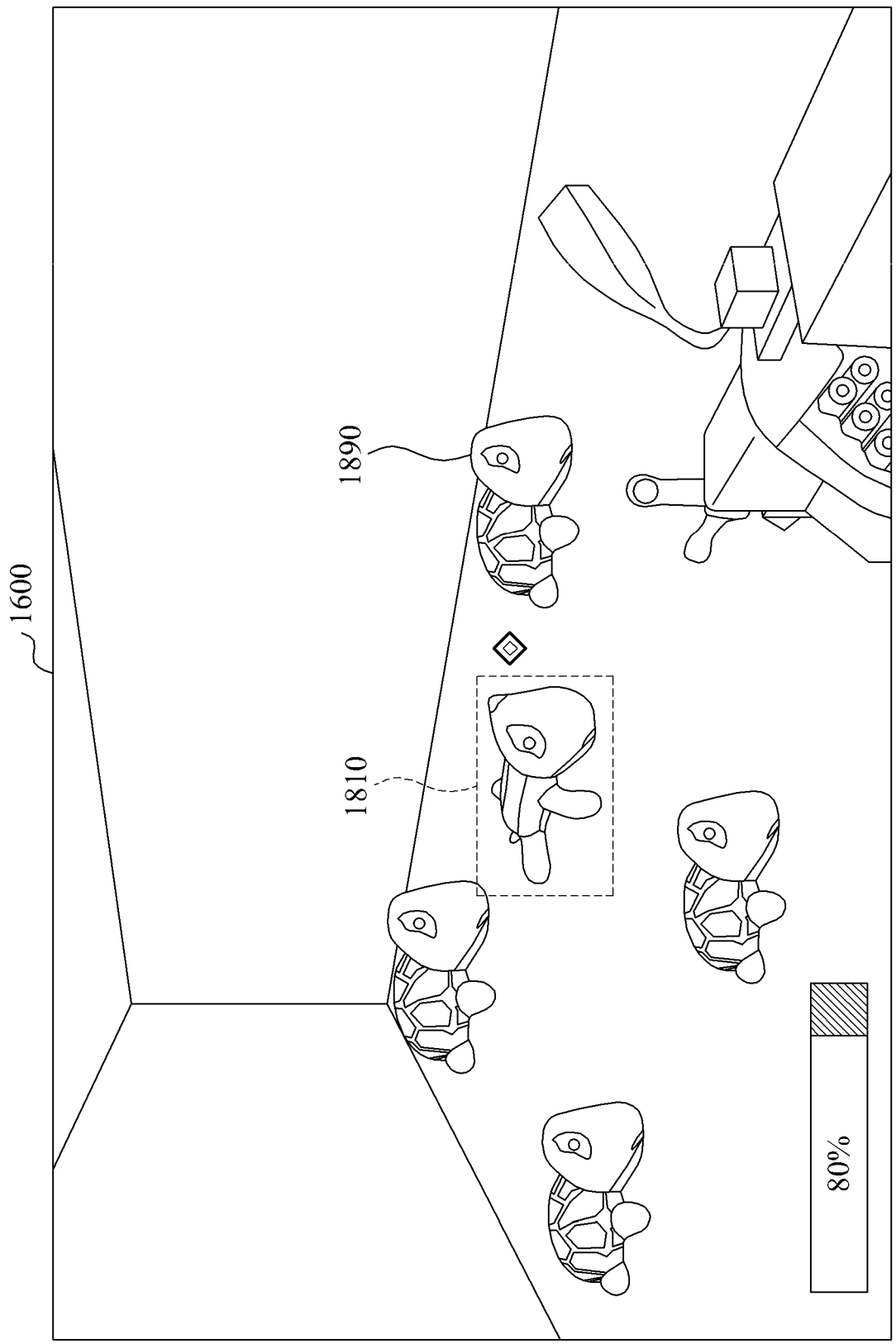

FIGS. 17A, 17B and 18 illustrate an example of providing an event according to one or more implementations of the present disclosure.

FIG. 17A is an example of a flowchart illustrating a method of providing an event object in a virtual world.

Referring to FIG. 17A, in operation 1701, the game server may arrange a plurality of predetermined event objects (for example, an event object 1890 of FIG. 18) in the virtual world. For example, the game server may create a game room and may arrange the event objects in the virtual word before each stage of a game is started.

In operation 1751, the game server may select at least one candidate object as a predetermined similar object set to have a similar shape to the event objects. For example, referring to FIG. 18, a similar object 1810 may have a similar shape to the event object 1890 having a shape of a turtle. Due to the similar object 1810, a second user may be induced to confuse the similar object 1810 with the event objects 1890. Accordingly, a first user may more easily hide from the second user.

FIG. 17B is an example of a flowchart illustrating a method of providing the same object in the virtual world based on a predetermined event in operation 450 of FIG. 4.

Referring to FIG. 17B, in operation 1752, the game server may select candidate objects with the same shape, in response to the morphing control of the first user. For example, all first users may change first objects to second objects with the same shape and accordingly, the second user may more easily find a second object corresponding to a first user and may attack the found second object. In this example, all first user terminals may select and provide the same identification information.

According to one or more implementations, an object similar to an object in a map or the same object corresponding to all users may be selected as a candidate object based on an event and accordingly, an interest in a game may increase. In addition, a similar object or the same object may be provided as a candidate object in the map and thus, it is possible to reduce a resource used in the game server or the user terminal.

FIG. 18 illustrates an example of a game screen 1600 in which the similar object 1810 is provided in the virtual world based on a predetermined event. In FIG. 18, event objects 1890 (for example, an object with a shape of a turtle) may be positioned in the virtual world. The first user may allow the first object to morph into the similar object 1810. The similar object 1810 may have a similar shape to the event object 1890.

Figure 19:
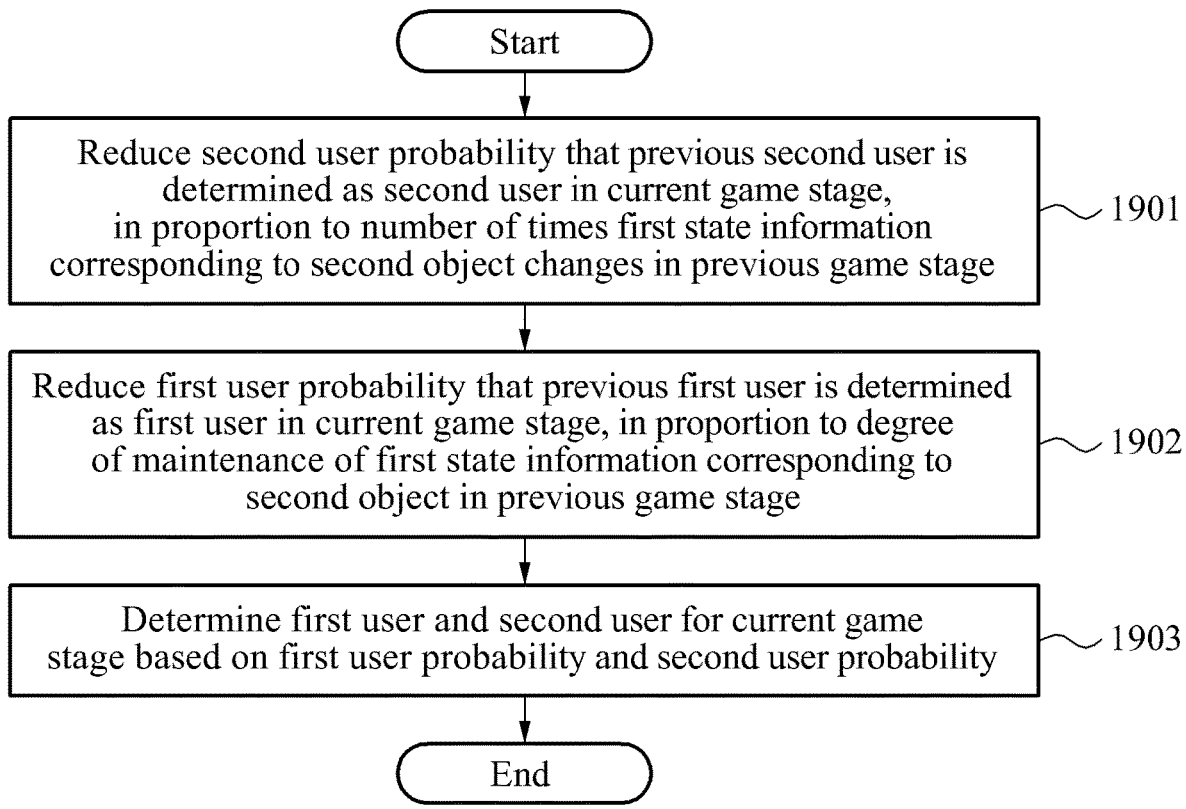
FIG. 19 is a flowchart illustrating an example of a method of determining game participants as either a first user or a second user according to one or more implementations of the present disclosure.

FIG. 19 is an example of a flowchart illustrating a method of determining game participants as either a first user or a second user according to one or more implementations.

A game server may classify users accessing a game as first users or second users before a beginning of each game (for example, each stage of the game). According to one or more implementations, the users may be classified into two groups based on a result of a last game stage and thus, an interest in the game may not be reduced. For example, two groups into which users are classified based on a game result may have similar winning rates of the game.

Referring to FIG. 19, in operation 1901, the game server may reduce a second user probability that a previous second user is determined as a second user in a current game stage, in proportion to a number of times first state information corresponding to a second object changes in a previous game stage. For example, the second user probability may be set so that a second user playing in an active part in a previous stage and killing a plurality of first users may be determined as a first user to allow the other users to continue to feel interested in a game. In this example, the previous stage may include a stage immediately preceding a current stage and all stages preceding the current stage. Additionally, when the game server functions as a second user in the stage immediately preceding the current stage, the game server may set a limit so that the second user may not be determined as a second user in the current stage.

In operation 1902, the game server may reduce a first user probability that a previous first user is determined as a first user in the current game stage, in proportion to a degree of maintenance of the first state information corresponding to the second object in the previous game stage. For example, the first user probability may be determined so that a first user playing in an active part in a previous stage and not attacked by the second user may be determined as a second user to allow the other users to continue to feel interested in a game.

In operation 1903, the game server may determine a first user and a second user for the current game stage based on the first user probability and the second user probability. Based on the first user probability and the second user probability determined in operations 1901 and 1902, the game server may classify users participating in a current stage of a game as first users or second users.

FIGS. 20A through 20D illustrate other examples of operation 450 of FIG. 4.

Figure 20A:
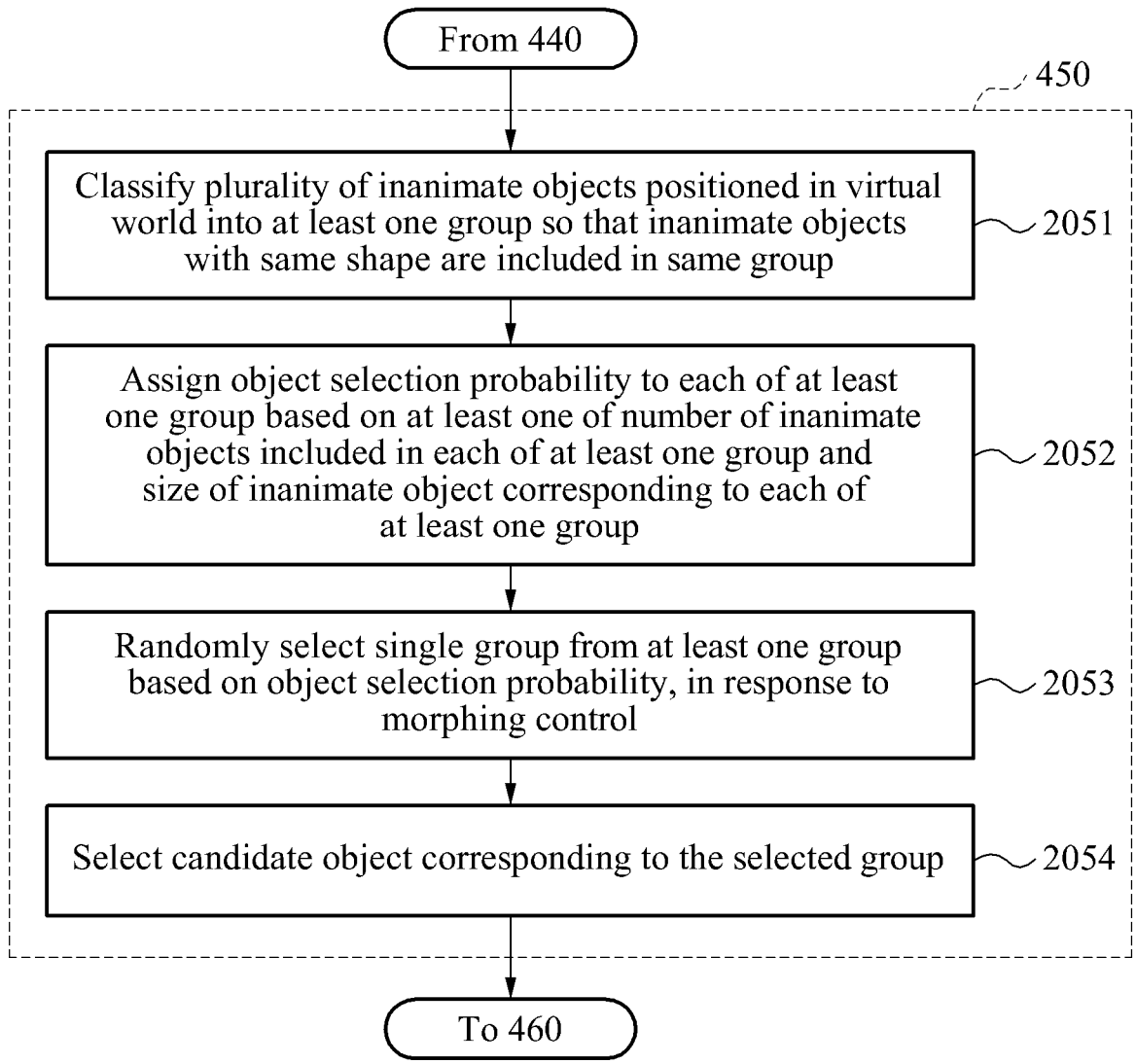
FIGS. 20A through 20D illustrate examples of an operation of selecting a candidate object described with reference to the method of FIG. 4.

FIG. 20A is an example of a flowchart illustrating a method of selecting a candidate object by adding an object selection probability.

Referring to FIG. 20A, in operation 2051, the game server may classify a plurality of inanimate objects positioned in the virtual world into at least one group so that inanimate objects with the same shape may be included in the same group. Each group may be representative of the same type of inanimate objects with the same shape.

In operation 2052, the game server may assign an object selection probability to each of the at least one group based on at least one of a number of inanimate objects included in each of the at least one group and a size of an inanimate object corresponding to each of the at least one group. In an example, the object selection probability may be set to be proportional or inverse proportional to a number of inanimate objects of a predetermined type positioned in a map of the virtual world. In another example, the object selection probability may be set to be proportional to a size of an inanimate object.

According to one or more implementations, the above-described candidate objects may be selected based on inanimate objects in the virtual world and thus, it is possible to control a game balance between groups.

In addition, according to one or more implementations, an object selection probability may be set to increase as a size of an inanimate object increases and accordingly, a second user may easily find a second object corresponding to a first user. Thus, it is possible to increase an interest of the second user in a game.

In operation 2053, the game server may randomly select a single group from the at least one group based on the object selection probability, in response to the morphing control.

In operation 2054, the game server may select a candidate object corresponding to the selected group.

Figure 20B:
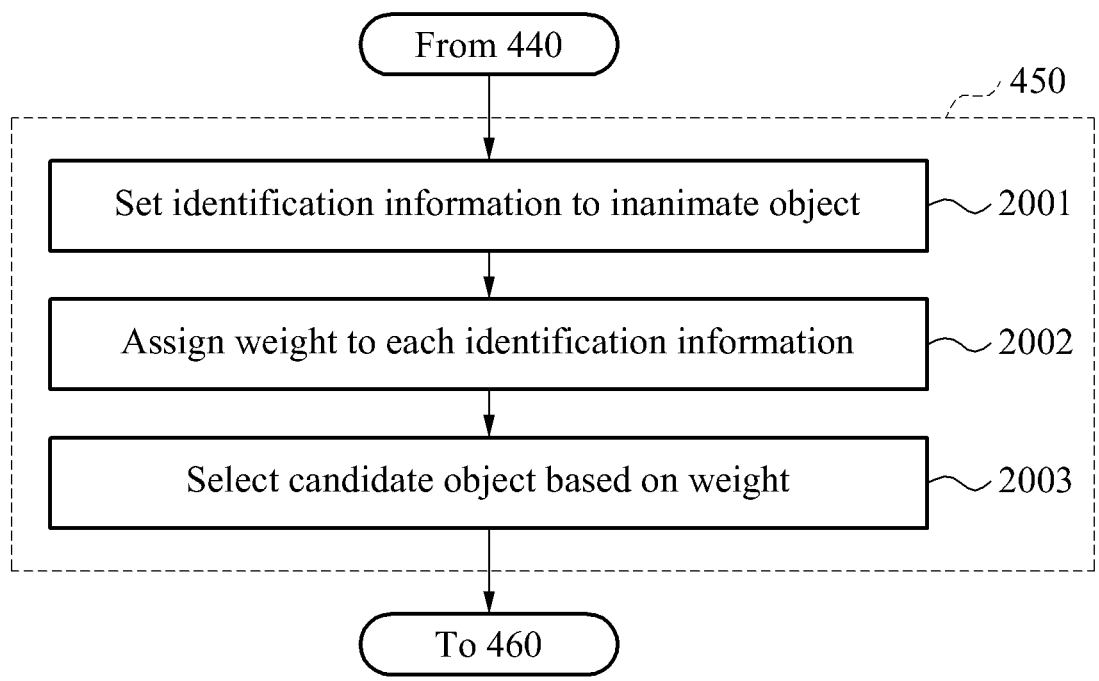

FIG. 20B is an example of is a flowchart illustrating a method of selecting a candidate object by assigning a weight.

Referring to FIG. 20B, in operation 2001, the user terminal or the game server may set identification information to an inanimate object. For example, the identification information may be set similarly to one of operation 801 of FIG. 8B, operation 805 of FIG. 8C and operation 807 of FIG. 8D. In the following description, operation 801 may be performed to set identification information to an inanimate object, however, there is no limitation thereto. Another scheme may be used to set identification information to an inanimate object.

In operation 2002, the user terminal or the game server may assign a weight to each identification information. For example, the weight may be arbitrarily set by a service provider, may be randomly set, may be set by a user, or may be automatically set. In the following description, the weight may be a natural number, however, there is no limitation thereto. Accordingly, another numeric type, for example a real number, may be used as a weight.

In the following description, a total of three inanimate objects may exist. That is, inanimate objects #0, #1 and #2 may exist, and weights of "10," "20" and "30" may be assigned to the inanimate objects #0, #1 and #2, respectively. However, there is no limitation thereto, and a number of inanimate objects and a weight assigned to identification information corresponding to each inanimate object may be changed based on a design.

In operation 2003, the user terminal or the game server may select a candidate object based on the weight. Operation 2003 is further described with reference to FIGS. 20C and 20D.

Figure 20C:
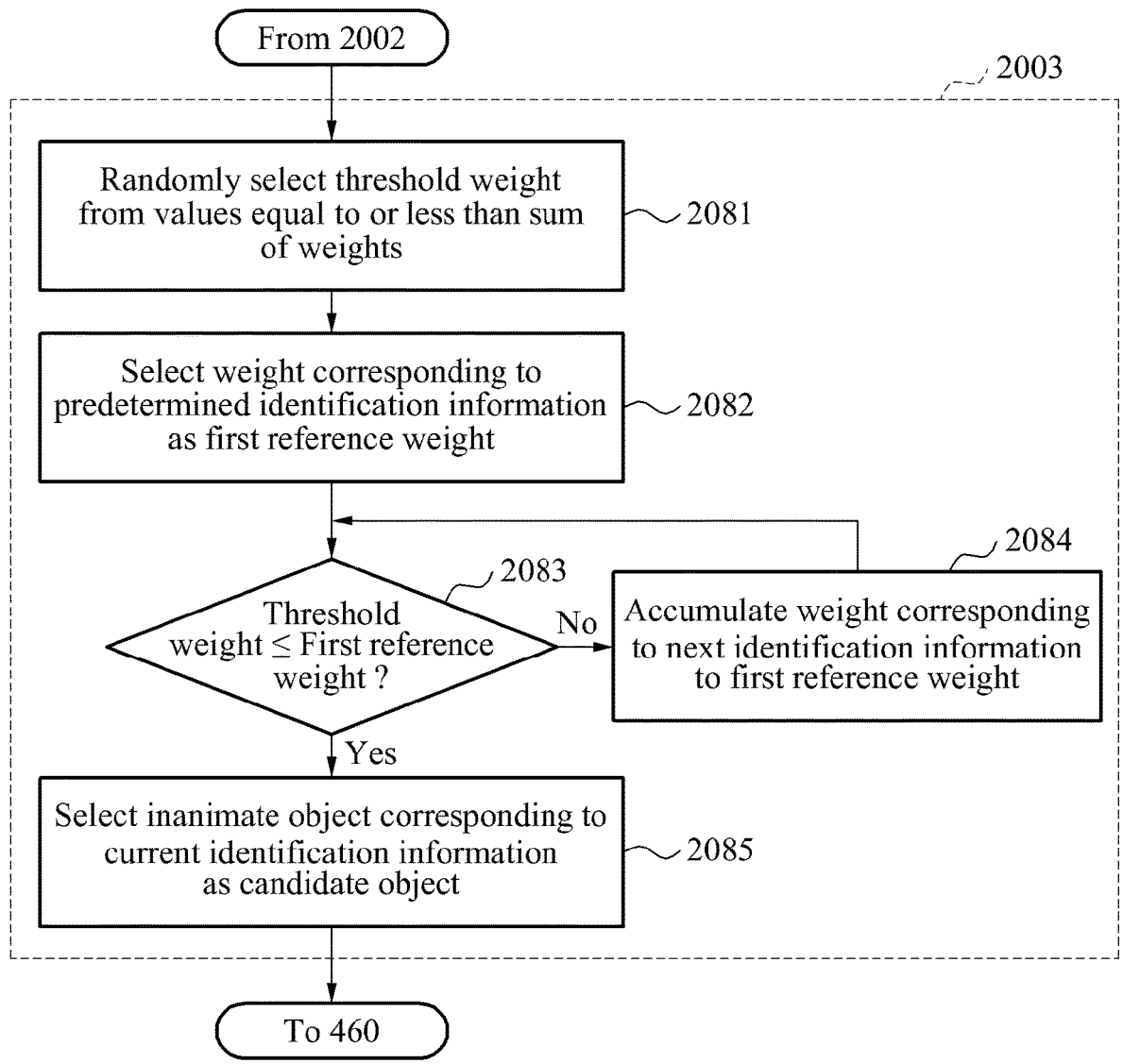

FIG. 20C is an example of a flowchart illustrating an example of operation 2003 of FIG. 20B.

Referring to FIG. 20C, in operation 2081, the game server may randomly select a threshold weight from values equal to or less than a sum of weights. For example, when weights of "10," "20" and "30" are assigned to the inanimate objects #0, #1 and #2, respectively, a sum of weights may be calculated as "60." In this example, the game server may randomly select, as a threshold weight, a value from values "0" through "60." In operation 2081, a threshold weight of "28" may be selected.

In operation 2082, the game server may select a weight corresponding to predetermined identification information as a first reference weight. The predetermined identification information may be represented, for example, by i that is equal to or greater than "0." Initially, current identification information i may be set to "0." For example, the game server may select a weight corresponding to the inanimate object #0 as the first reference weight. The weight of "10" may be assigned to the inanimate object #0 and accordingly, the first reference weight may be "10."

In operation 2083, the game server may compare the threshold weight to the first reference weight. For example, the game server may determine whether the first reference weight is equal to or greater than the threshold weight.

In operation 2084, the game server may accumulate a weight corresponding to next identification information i+1 to the first reference weight, in response to the first reference weight being less than the threshold weight. For example, the first reference weight (for example, "10") may be less than the threshold weight (for example, "28") and accordingly, the game server may accumulate a weight assigned to the inanimate object #1 as next identification information to the first reference weight. The accumulating may indicate adding a weight corresponding to the next identification information to the first reference weight. In this example, the first reference weight to which the weight corresponding to the next identification information is accumulated may be calculated as "30." When the accumulating is performed, the game server may compare the threshold weight to the first reference weight to which the weight corresponding to the next identification information i+1 is accumulated in operation 2083. An index of identification information may increase by "1."

In operation 2085, the game server may select an inanimate object corresponding to the current identification information as a candidate object, in response to the first reference weight being equal to or greater than the threshold weight. For example, the first reference weight of "30" that is greater than the threshold weight of "28" may be obtained by accumulating the weight assigned to the inanimate object #1 in operation 2084. Accordingly, the inanimate object #1 corresponding to the current identification information may be selected as a candidate object.

Figure 20D:
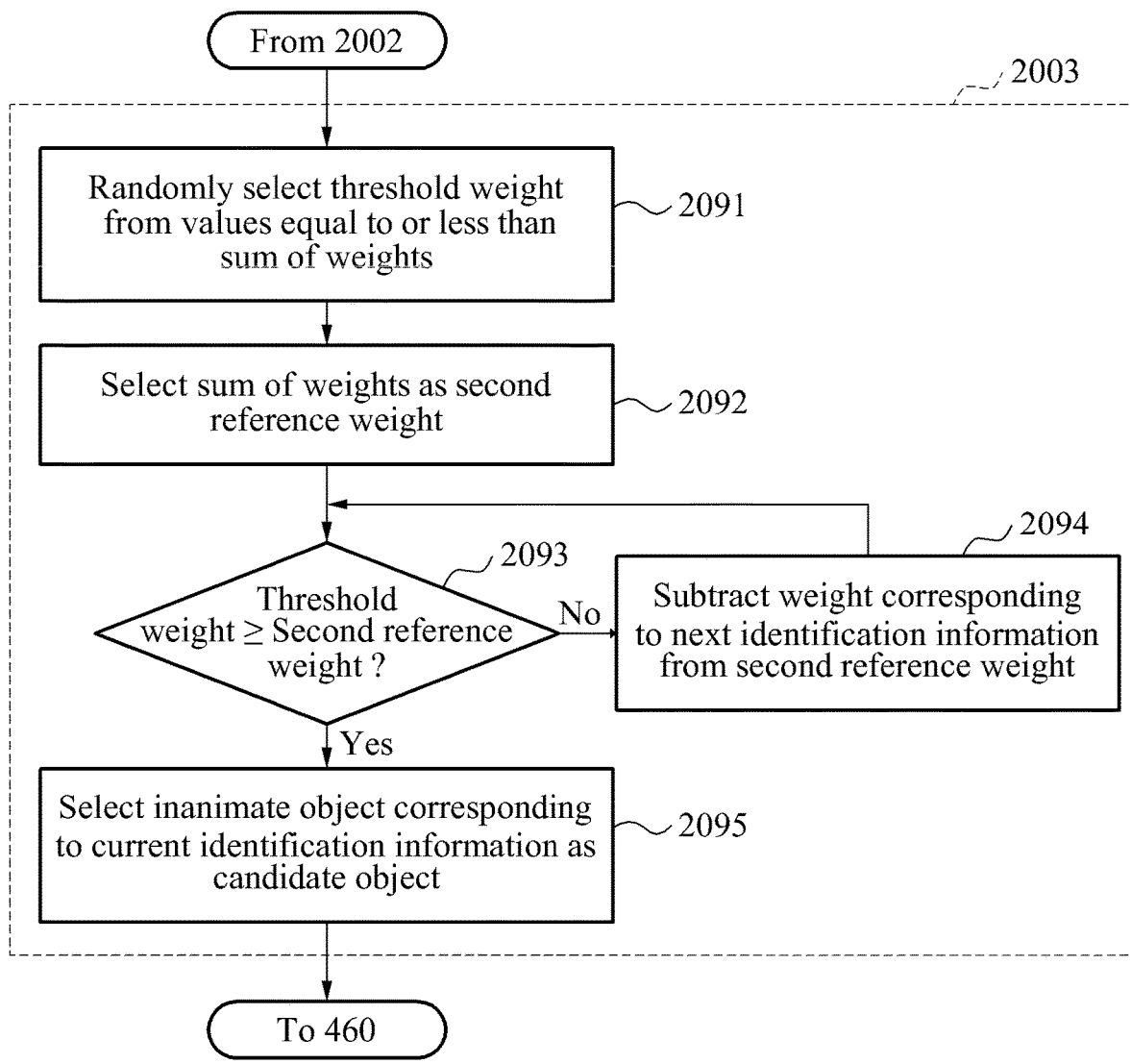

FIG. 20D is an example of a flowchart illustrating another example of operation 2003 of FIG. 20B.

Referring to FIG. 20D, in operation 2091, the game server may randomly select a threshold weight from values equal to or less than a sum of weights. Operation 2091 may be performed similarly to operation 2081 of FIG. 20C, and a threshold weight of "32" may be selected in operation 2091.

In operation 2092, the game server may select the sum of weights as a second reference weight. For example, the game server may select, as the second reference weight, "60" that is obtained by adding up weights assigned to the inanimate objects #0 through #2.

In operation 2093, the game server may compare the threshold weight to the second reference weight. For example, the game server may determine whether the second reference weight is equal to or less than the threshold weight.

In operation 2094, the game server may subtract a weight corresponding to next identification information i+1 from the second reference weight, in response to the second reference weight being greater than the threshold weight. For example, the second reference weight (for example, "60") may be greater than the threshold weight (for example, "32) and accordingly, the game server may subtract a weight assigned to the inanimate object #1 as next identification information from the second reference weight. In this example, the second reference weight from which the weight corresponding to the next identification information is subtracted may be calculated as "40." When the subtracting is performed, the game server may compare the threshold weight to the second reference weight from which the weight corresponding to the next identification information i+1 is subtracted in operation 2093. An index of identification information may increase by "1."

In operation 2095, the game server may select an inanimate object corresponding to the current identification information as a candidate object, in response to the second reference weight being equal to or less than the threshold weight. For example, the second reference weight from which the weight assigned to the inanimate object #1 is subtracted in operation 2094 may be "40," that is, less than the threshold weight of "32." Accordingly, the inanimate object #1 corresponding to the current identification information may be selected as a candidate object.

Figure 21:
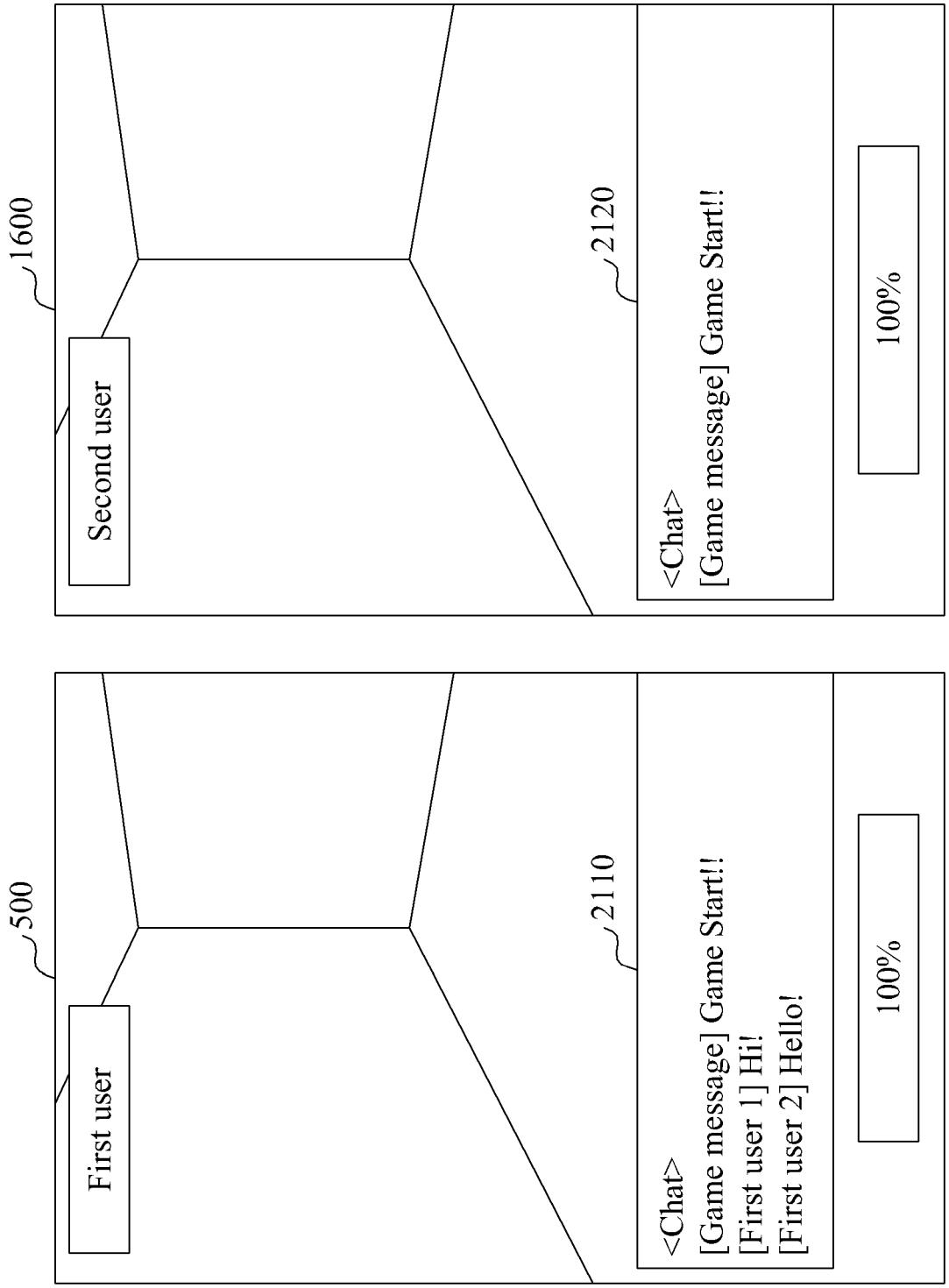
FIG. 21 illustrates an example of sharing conversation messages between users according to one or more implementations of the present disclosure.

FIG. 21 illustrates an example of sharing conversation messages between users according to one or more implementations of the present disclosure.

In a left side and a right side of FIG. 21, a game screen 500 of a first user terminal, and a game screen 1600 of a second user terminal are illustrated respectively. In FIG. 21, a conversation message with another first user may be displayed using a first chat interface 2110 of the first user terminal on the game screen 500 and accordingly, a conversation message received from a first user may be shared with at least one first user other than the first user. Conversely, conversation messages between first users may not be exposed via a second chat interface 2120 of the second user terminal.

As described above, conversation messages may be shared between users in the same group and accordingly, the users may more strategically play a game in cooperation with each other. According to one or more implementations, a chat service enabling a chat between users in the same group may be provided and thus, it is possible to strengthen security and a strategy of a game.

Figure 22:
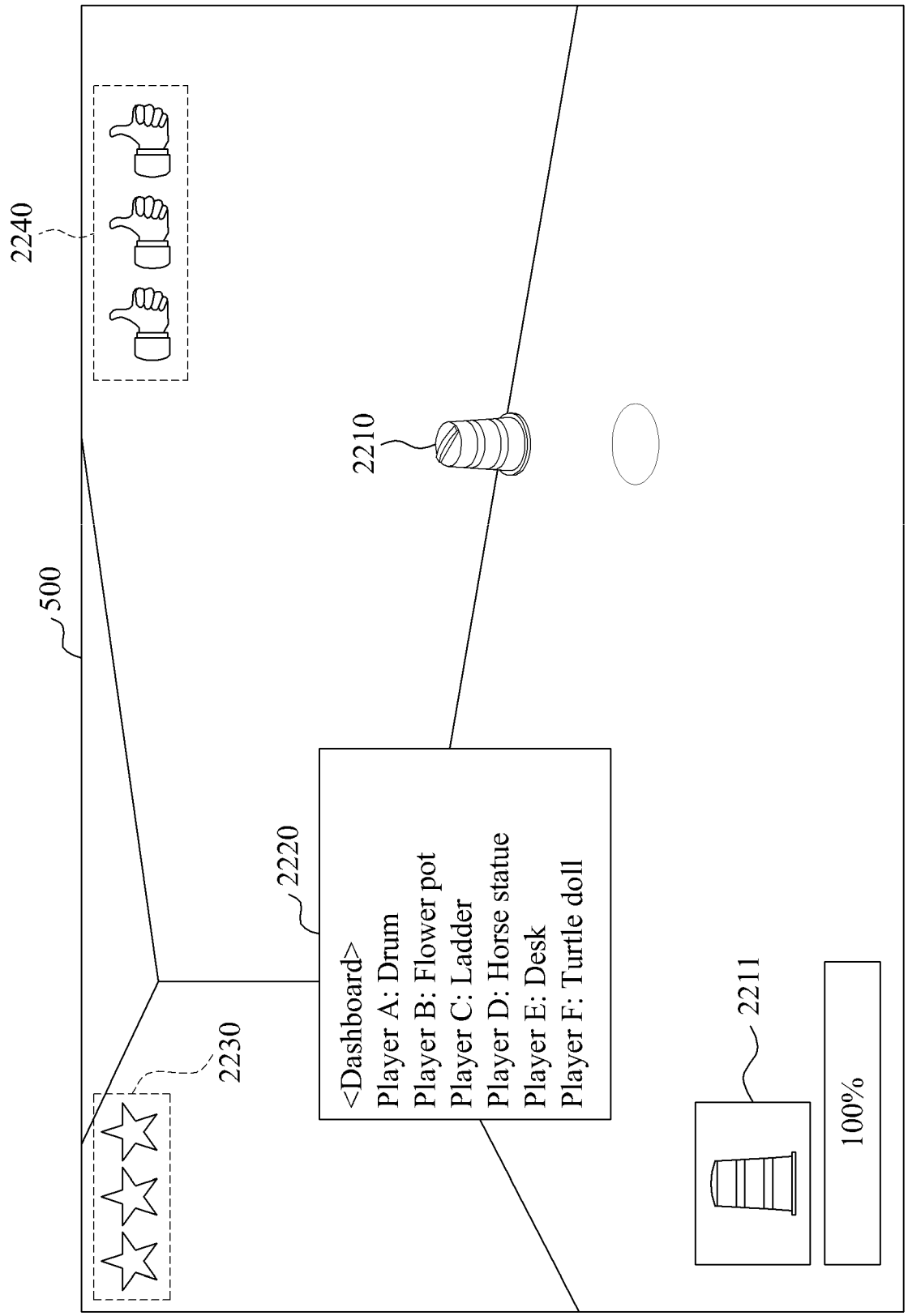
FIG. 22 illustrates an example of a screen provided to a first user according to one or more implementations of the present disclosure.

FIG. 22 illustrates an example of a screen provided to a first user according to one or more implementations.

Interfaces additionally provided in a first user terminal are described with reference to FIG. 22.

A survival bonus interface 2230 may display a survival bonus acquired based on an increase in a period of time during which a first object or a second object 2210 corresponding to the first user survives. The survival bonus may be represented, for example, by a number of star icons as shown in FIG. 22.

A morphing summary interface 2211 may provide summary information associated with morphing. For example, the morphing summary interface 2211 may provide a two-dimensional (2D) image representing the second object 2210 to the first user so that the first user may easily verify a type of the second object 2210 into which the first object morphs.

A situation interface 2220 may provide information associated with the second object 2210 so that each of first users in the same group may verify a type of the second object 2210. For example, the situation interface 2220 may display the type of the second object 2210 corresponding to each of the first users visually or by text. In FIG. 22, the situation interface 2220 may indicate that an object corresponding to a player A as a first user morphs into a drum.

A compliment interface 2240 may display information associated with a compliment given to a first user (for example, a first user in a survival state) from the other first users in an observer mode. For example, first users already died may compliment a first user surviving during a longest period of time and thus, an interest in a game may increase.

Figure 23:
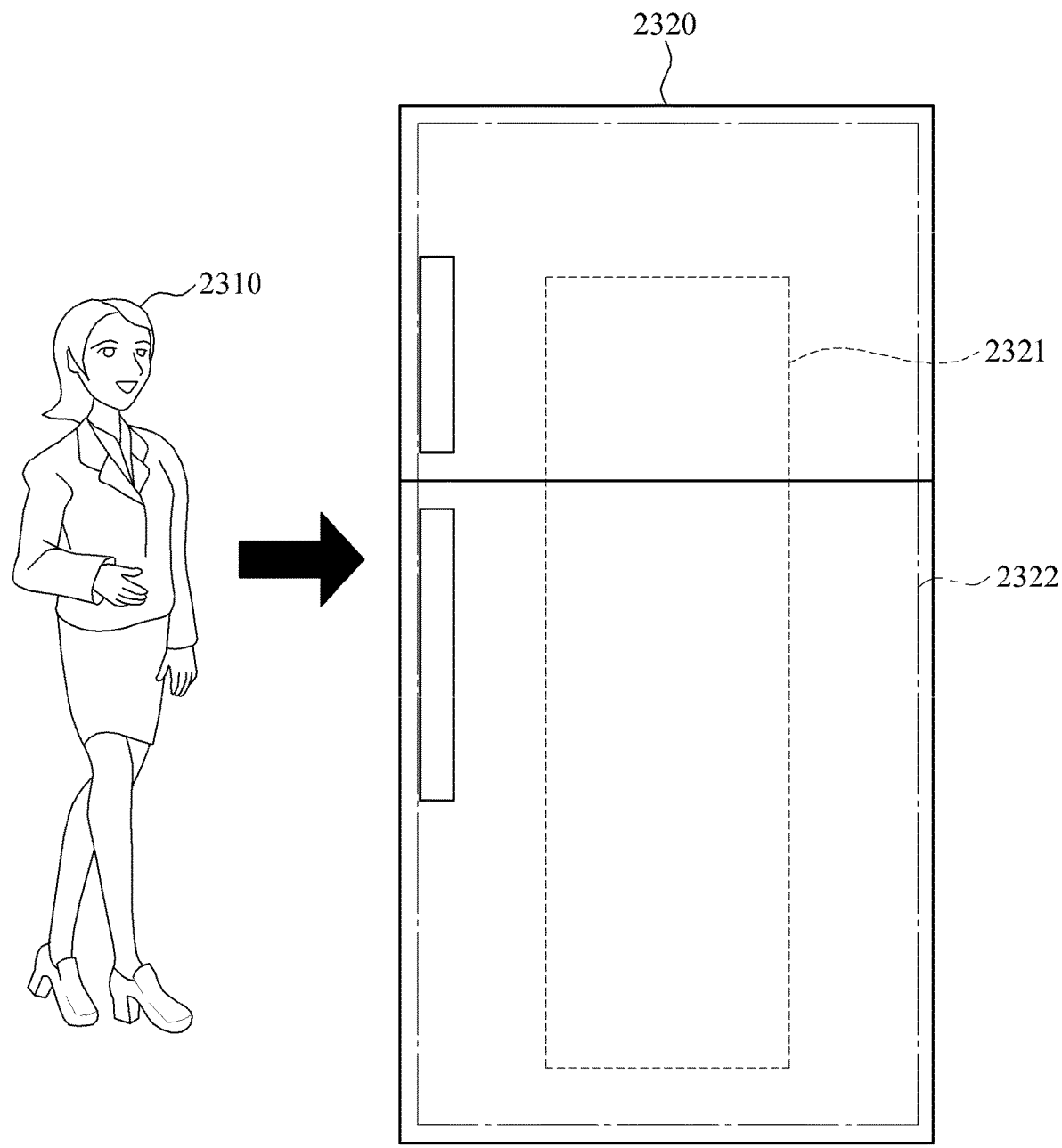

FIGS. 23 and 24 illustrate examples of a change in a collision box, a judgment box and an appearance of an object in a virtual world according to one or more implementations of the present disclosure.

FIG. 23 illustrates an example of a change in a collision box, a judgment box and an appearance of an object with a human attribute in a virtual world.

The appearance of the object may be expressed by a resource, for example, a polygon or texture in a virtual world. For example, the appearance of the object may be three-dimensionally represented.

The collision box of the object may be a space or a range in which the object interacts with another object in the virtual world, and the object may exist within a range in which a boundary of the collision box does not reach or overlap a boundary of the virtual world or a boundary of a collision box of the other object. For example, when the boundary of the collision box reaches the boundary of the collision box of the other object, a movement of the object may be limited. The collision box may be, for example, a three-dimensional (3D) space with a range and a size (for example, a 3D volume). The collision box may be implemented, for example, as a bounding box.

The judgment box of the object may indicate a range in which a state change control by another object in the virtual world is valid. For example, when an attack by a second user on an object corresponding to a first user by aiming at a judgment box of the object succeeds, the state change control may be valid. For example, the judgment box may be a 3D space with a range and a size.

In the present disclosure, the collision box and the judgment box may be expressed as boxes, however, may not be limited to a rectangular parallelepiped. Accordingly, all 3D shapes including, for example a polyhedron or a globular shape, may be applicable to the collision box and the judgment box. Also, a shape of a box may not be limited to a 3D shape, and all 2D shapes including, for example a polygon, a circle or an oval, may be applicable to the collision box and the judgment box.

Referring to FIG. 23, a collision box and a judgment box of a first object 2310 with a human attribute before morphing is performed may be set to have the same size and range as an appearance of the first object 2310.

When the first object 2310 is changed to a second object 2320, the appearance of the first object 2310 may also be changed. For example, a user terminal may delete an appearance resource corresponding to the human attribute, and may set, as an appearance resource of the first object 2310, an appearance resource corresponding to an inanimate object attribute of an inanimate object into which the first object 2310 is to morph.

A size and range of a collision box 2321 of the second object 2320 into which the first object 2310 morphs may be set to differ from a size and range of an appearance of the second object 2320. The second object 2320 may have an appearance resource of a refrigerator, and the size of the collision box 2321 may be set to be less than the appearance resource of the refrigerator. Additionally, a size and range of a judgment box 2322 of the second object 2320 may be set to be identical to the size and range of the appearance of the second object 2320.

When a movement control is being received from a user, a user terminal may temporarily change a space of the collision box 2321 (for example, the size and range of the collision box 2321). In response to a reception of the movement control being terminated, the user terminal may restore the space of the collision box 2321 to the original space (for example, the space that is not changed). For example, the user terminal may change the space of the collision box 2321 from a first collision space to a second collision space in response to the reception of the movement control, and may change the space of the collision box 2321 from the second collision space to the first collision space in response to the reception of the movement control being terminated.

However, the size and range of each of the collision box 2321 and the judgment box 2322 may not be limited to those described above, and may be changed based on a design. A shape of each of the collision box 2321 and the judgment box 2322 may also be set to be identical to or different from a shape of the appearance resource of the first object 2310, if necessary.

FIG. 24 illustrates an example of a collision box and an appearance of a second object in an arbitrary virtual space.

Referring to FIG. 24, a virtual space 2400 may include a wall and a door 2409. An appearance 2410 of a second object may be greater in size than the door 2409 in the virtual space 2400. For example, when a collision box 2411 of the second object is set to be identical to the appearance 2410, the second object may not pass through the door 2409. The appearance 2410 and the collision box 2411 may have cylindrical shapes as shown in FIG. 24, however, there is no limitation thereto. For example, a 2D space or 3D space may be set.

A user terminal may set the collision box 2411 to have a size and range enabling the second object to pass through the door 2409. Accordingly, an object corresponding to a first user may freely move in the virtual space 2400, even though the object morphs into the second object greater in size than the door 2409.

In response to a movement control being received from a user, the user terminal may change a space of the collision box 2411 from a first collision space to a second collision space. When the movement control is continuously received, the user terminal may maintain the space of the collision box 2411 as the second collision space. In response to the movement control not being received from the user (for example, in response to a reception of the movement control being terminated), the user terminal may change the space of the collision box 2411 from the second collision space to the first collision space. The first collision space may be, for example, a space with the same size and range as those of an appearance of an object in the virtual world, and the second collision space may be, for example, a space with a size and range less than those of the object.

In the example of FIG. 24, the movement control may be continuously received from the user. When the user continues to input the movement control to control the second object to pass through the door 2409, the user terminal may change the space of the collision box 2411 to the second collision space that is smaller in size than the second object (for example, a size enabling the second object to pass through a door). When the second object passes through the door 2409 under the control of the user, and when the user interrupts an input of the movement control, the user terminal may change the space of the collision box 2411 from the second collision space to the first collision space. As described above, a size of a collision box of an object may be reduced only when the object moves and thus, it is possible to minimize a disharmony between the collision box and an appearance of the object instead of limiting a movement of the object in the virtual world. Additionally, a space of the collision box may be set to be similar to or the same as the appearance of the object when the object does not move and thus, it is possible to prevent a second user from misunderstanding based on an action of attempting to collide without an attack that the object corresponds to a second object controlled by a first user instead of a background object in a virtual world.

Apparatuses for performing each of operations described above with reference to FIGS. 1 through 24 and an order of the operations are merely examples. Accordingly, at least one of a game server, a first user terminal, a second user terminal and another user terminal may perform the operations, the order of the operations may be changed based on a design, and operations shown in the drawings may be combined and performed based on a design. Also, a first object may mainly correspond to a first user in the description of FIGS. 1 through 24, however, may not be limited. For example, a second object may correspond to the first user.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art would appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described one or more implementations may be recorded in non-transitory computer-readable media including program instructions to implement various operations embodied by a computer. The instructions may be executable by one or more processors. The media may also include, alone or in combination with the program instructions, data files, data structures, and the like. The program instructions recorded on the media may be those specially designed and constructed for the purposes of the one or more implementations, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described one or more implementations of the present disclosure, or vice versa.

Although one or more exemplary implementations of the present disclosure have been shown and described, the present disclosure is not limited to the described one or more implementations. Instead, it would be appreciated by those skilled in the art that changes may be made to the exemplary one or more implementations without departing from the principles and scope of the present disclosure, the scope of which is defined by the claims and their legal equivalents.

Phrases such as an aspect, the aspect, another aspect, some aspects, one or more aspects, an implementation, the implementation, another implementation, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

It is understood that the specific order or hierarchy of steps, operations or processes disclosed is an illustration of exemplary approaches. Unless explicitly stated otherwise, it is understood that the specific order or hierarchy of steps, operations or processes may be rearranged. Some of the steps, operations or processes may be performed simultaneously. The accompanying method claims, if any, present elements of the various steps, operations or processes in a sample order, and are not meant to be limited to the specific order or hierarchy presented.

No claim element is to be construed under the provisions of 35 U.S.C. § 112, sixth paragraph, unless the element is expressly recited using a phrase means for or, in the case of a method claim, the element is recited using the phrase step for.

The title, background, summary, brief description of the drawings, abstract, and appended drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A non-transitory computer-readable storage medium comprising instructions executable by one or more processors to perform one or more operations, the one or more operations comprising:
   controlling a first object corresponding to a first user in a virtual world to be displayed;
   controlling the first object to move in the virtual world, in response to a movement control of the first user;
   randomly selecting at least one candidate object; and
   changing the first object to a second object when the second object is selected from the at least one candidate object,
   wherein the controlling of the first object to move in the virtual world comprises:
     receiving, from the first user, an input of an observer mode entry control to enter an observer mode;
     providing the virtual world to the first user in the observer mode, in response to the observer mode entry control;
     replicating a camera object assigned to the first object;
     setting the movement control to be applied to the replicated camera object;
     controlling a movement of a perspective of a screen provided to the first user in the observer mode, in response to the movement control; and
     setting the movement control to be applied to the camera object and deleting the replicated camera object, in response to a reception of an observer mode termination control.

2. The medium of claim 1, wherein the code for randomly selecting of the at least one candidate object comprises:
   selecting at least one inanimate object from a predetermined inanimate object list and from inanimate objects positioned in the virtual world; and
   determining the at least one candidate object from the selected at least one inanimate object.

3. The medium of claim 1, wherein the controlling of the first object to move in the virtual world comprises:
   receiving an input of a freezing control from the first user, under the movement control;
   fixing a position of the first object in the virtual world at a position corresponding to a point in time when the freezing control is input in response to the freezing control; and
   disabling processing of a physical engine of the first object until an unfreezing control is input from the first user.

4. The medium of claim 1, wherein the changing of the first object to the second object comprises:
   setting a judgment box of the second object to have the same shape as that of an appearance of the second object, in response to the first object being changed to the second object; and
   changing a space of a collision box of the second object from a first collision space to a second collision space.

5. The medium of claim 1, wherein the one or more operations comprise:
   receiving, from a second user, a state change control to change a state of the first object or the second object, the first object and the second object corresponding to the first user;
   changing second state information of a third object corresponding to the second user, in response to the state change control;

verifying a validity of the state change control; and
changing first state information of the first object or the second object, in response to the state change control being valid.

6. The medium of claim 1, wherein the randomly selecting of the at least one candidate object comprises selecting candidate objects with same identification information to allow all the candidate objects to have a same shape, in response to a morphing control.

7. The medium of claim 1, wherein the one or more operations further comprise:
highlighting an outline of the second object and providing the second object to a third user in the observer mode.

8. The medium of claim 1, wherein the one or more operations further comprise:
selecting candidate objects with the same identification information so that all the candidate objects have the same shape, in response to a morphing control.

9. The medium of claim 1, wherein the one or more operations further comprise:
a second user with a dark screen during a predetermined period of time after start of a game.

10. A method of controlling an object, the method being performed by a processor and comprising:
controlling a first object corresponding to a first user in a virtual world to be displayed;
controlling the first object to move in the virtual world, in response to a movement control of the first user;
randomly selecting at least one candidate object; and
changing the first object to a second object when the second object is selected from the at least one candidate object,
wherein the controlling the first object to move in the virtual world comprises:
receiving, from the first user, an input of an observer mode entry control to enter an observer mode;
providing the virtual world to the first user in the observer mode, in response to the observer mode entry control;
replicating an original object corresponding to the first user, and fixing a position of the replicated object a camera object assigned to the first object;
changing a perspective of an original camera object associated with the original object to a free perspective;
controlling a movement of a perspective of a screen provided to the first user in the observer mode, in response to the movement control; and
restoring the original object to the position of the replicated object and reflecting a change in a state of the replicated object on the original object, in response to a reception of an observer mode termination control.

11. An apparatus for controlling an object, the apparatus comprising:
a communicator configured to communicate with a first user terminal and a second user terminal; and
a processor configured to control a first object corresponding to a first user in a virtual world to be displayed, configured to control the first object to move in the virtual world in response to a movement control of the first user, configured to randomly select at least one candidate object, and configured to change the first object to a second object when the second object is selected from the at least one candidate object,
wherein the processor is configured to receive, from the first user, an input of an observer mode entry control to enter an observer mode, configured to provide the virtual world to the first user in the observer mode, in response to the observer mode entry control, configured to replicate a camera object assigned to the first object, configured to set the movement control to be applied to the replicated camera object, configured to control a movement of a perspective of a screen provided to the first user in the observer mode, in response to the movement control, and configured to set the movement control to be applied to the camera object and delete the replicated camera object, in response to a reception of an observer mode termination control.

12. The apparatus of claim 11, wherein the processor is configured to determine, as the at least one candidate object, at least one of P initial candidate objects corresponding to a plurality of inanimate objects positioned in the virtual world.

13. The apparatus of claim 11, wherein the processor is configured to receive an input of a freezing control from the first user under the movement control, configured to fix a position of the first object in the virtual world at a position corresponding to a point in time when the freezing control is input, in response to the freezing control, and configured to disable processing of a physical engine of the first object until an unfreezing control is input from the first user.

14. The apparatus of claim 11, wherein when the virtual world is provided to a third user in the observer mode, the processor is configured to highlight an outline of the second object and provide the second object to the third user in the observer mode.

15. The apparatus of claim 11, wherein the processor is configured to randomly select the at least one candidate object, after a time limit for morphing elapses, and
wherein the processor is configured to maintain the first object, before the time limit for morphing elapses.

16. The apparatus of claim 11, wherein the processor is configured to receive, from a second user, a state change control to change a state of the first object or the second object,
wherein the processor is configured to change second state information of a third object corresponding to the second user in response to the state change control, and
wherein the processor is configured to change first state information of the first object or the second object in response to the state change control being valid.

17. The apparatus of claim 16, wherein the processor is configured to increase a moving speed of the third object in the virtual world during a predetermined time interval.

* * * * *